United States Patent
Kanda

(10) Patent No.: US 12,106,019 B2
(45) Date of Patent: Oct. 1, 2024

(54) OPTIMIZATION DEVICE AND OPTIMIZATION METHOD

(71) Applicant: FUJITSU LIMITED, Kawasaki (JP)

(72) Inventor: Kouichi Kanda, Chofu (JP)

(73) Assignee: FUJITSU LIMITED, Kawasaki (JP)

( * ) Notice: Subject to any disclaimer, the term of this patent is extended or adjusted under 35 U.S.C. 154(b) by 877 days.

(21) Appl. No.: 17/189,319

(22) Filed: Mar. 2, 2021

(65) Prior Publication Data

US 2021/0303755 A1 Sep. 30, 2021

(30) Foreign Application Priority Data

Mar. 26, 2020 (JP) .................. 2020-055373

(51) Int. Cl.
*G06F 30/20* (2020.01)
*G06N 7/08* (2006.01)
*G06F 119/06* (2020.01)

(52) U.S. Cl.
CPC .......... *G06F 30/20* (2020.01); *G06N 7/08* (2013.01); *G06F 2119/06* (2020.01)

(58) Field of Classification Search
CPC ....... G06F 30/20; G06F 2119/06; G06N 7/08; G06N 3/044; G06N 3/047; G06N 3/063; G06N 7/01; G06N 5/01; G06Q 10/04; G06Q 10/067
See application file for complete search history.

(56) References Cited

U.S. PATENT DOCUMENTS

| | | |
|---|---|---|
| 2005/0117398 A1 | 6/2005 | Hirai |
| 2017/0220924 A1* | 8/2017 | Danjo .................. G06N 7/01 |
| 2017/0351947 A1* | 12/2017 | Tamura ................. G06N 10/00 |
| 2017/0351949 A1* | 12/2017 | Matsubara ............. G06N 3/044 |
| 2018/0075342 A1* | 3/2018 | Tamura ................. G06N 3/044 |

(Continued)

FOREIGN PATENT DOCUMENTS

| | | |
|---|---|---|
| JP | H07-036473 A | 2/1995 |
| JP | 2003-263890 A | 9/2003 |

OTHER PUBLICATIONS

Extended European Search Report dated Sep. 7, 2021 for corresponding European Patent Application No. 21158935.3, 8 pages.
Liu, Xiaoyuan et al., "On Modeling Local Search with Special-Purpose Combinatorial Optimization Hardware", arxiv.org, Cornell University Library, 201 Olin Library Cornell University Ithaca, NY 14853, XP081585677, pp. 1-24, Nov. 22, 2019.

(Continued)

*Primary Examiner* — Hien L Duong
(74) *Attorney, Agent, or Firm* — Fujitsu Intellectual Property Center

(57) ABSTRACT

A method includes: calculating a change amount of energy of an Ising model, the change amount being caused when values of four states are changed, for each of a plurality of first states having a value of 0 before change, so as to satisfy a constraint that a sum of values of states included in each row is 1, and a sum of values of states included in each column is 1, when N (an integer of 2 or larger) squared state variables included in an evaluation function representing the energy of the Ising model are arrayed in N rows and N columns; selecting the four states allowed to change by using the change amount calculated for each of the plurality of first states, and outputting identification information for identifying the four states; and updating values of the four states allowed to change by using the identification information.

6 Claims, 26 Drawing Sheets

(56) References Cited

U.S. PATENT DOCUMENTS

| | | | | |
|---|---|---|---|---|
| 2018/0107172 | A1* | 4/2018 | Takatsu | G05D 23/1917 |
| 2018/0349325 | A1* | 12/2018 | Okuyama | G06F 7/48 |
| 2019/0012409 | A1* | 1/2019 | Matsubara | G06F 30/367 |
| 2019/0012410 | A1* | 1/2019 | Matsubara | G06F 7/588 |
| 2019/0155330 | A1* | 5/2019 | Yamaoka | G06N 3/044 |
| 2019/0278829 | A1* | 9/2019 | Takatsu | G06F 17/17 |
| 2020/0042570 | A1* | 2/2020 | Tamura | G06F 17/11 |
| 2020/0050921 | A1* | 2/2020 | Tamura | G06N 3/047 |
| 2020/0151548 | A1* | 5/2020 | Yoneoka | G06N 3/063 |
| 2020/0327955 | A1* | 10/2020 | Sato | G16B 15/20 |
| 2021/0239481 | A1* | 8/2021 | Handa | G06Q 10/047 |
| 2021/0256090 | A1* | 8/2021 | Watanabe | G06N 3/047 |
| 2021/0342505 | A1* | 11/2021 | Liu | G06N 10/00 |
| 2022/0019714 | A1* | 1/2022 | Endo | G06F 17/11 |
| 2022/0335323 | A1* | 10/2022 | Takano | G06N 10/60 |

OTHER PUBLICATIONS

Tsukamoto, Sanroku et al., "An Accelerator Architecture for Combinatorial Optimization Problems", Fujitsu Scientific & Technical Journal (FSTJ), vol. 53, No. 5, XP055673462, pp. 8-13, Sep. 1, 2017.

Gyoten, Hidenori et al., "Enhancing the Solution Quality of Hardware Ising-Model Solver via Parallel Tempering", Computer-Aided Design, ACM, 2 Penn Plaza, Suite 701New YorkNY10121-0701USA, XP058421047, DOI: 10.1145/3240765.3240806, ISBN: 978-1-4503-5950-4, 8 pages, Nov. 5, 2018.

Chinese Office Action dated Jan. 21, 2024 for corresponding Chinese Patent Application No. 202110275105.8 with English Translation, 19 pages.

Chinese Office Action dated Jun. 28, 2024 for corresponding Chinese Patent Application No. 202110275105.8, English Translation, 12 pages.

* cited by examiner

FIG. 6

|  | BEFORE STATE TRANSITION | | | | | | AFTER STATE TRANSITION | | | | | |
|  | 1 | 0 | 0 | 1 | | | 1 | 0 | 0 | 1 | | |
|  | $h_i$ | $h_j$ | $h_k$ | $h_l$ | $W_{il}$ | $W_{jk}$ | $h_i$ | $h_j$ | $h_k$ | $h_l$ | $W_{il}$ | $W_{jk}$ |
| --- | --- | --- | --- | --- | --- | --- | --- | --- | --- | --- | --- | --- |
| 1 | 1 | 1 | 1 | 1 | (1,1) | (1,1) | 4 | 1 | 24 | 21 | (4,21) | (1,24) |
| 2 | 1 | 2 | 16 | 17 | (1,17) | (2,16) | 4 | 2 | 19 | 17 | (4,17) | (2,19) |
| 3 | 1 | 3 | 6 | 8 | (1,8) | (3,6) | 4 | 3 | 9 | 8 | (4,8) | (3,9) |
| 4 | 1 | 4 | 21 | 24 | (1,24) | (4,21) | 4 | 4 | 4 | 4 | (4,4) | (4,4) |
| 5 | 1 | 5 | 11 | 15 | (1,15) | (5,11) | 4 | 5 | 14 | 15 | (4,15) | (5,14) |
| 6 | 8 | 6 | 3 | 1 | (8,1) | (6,3) | 8 | 6 | 23 | 21 | (8,21) | (6,23) |
| 7 | 8 | 7 | 18 | 17 | (8,17) | (7,18) | 8 | 7 | 18 | 17 | (8,17) | (7,18) |
| 8 | 8 | 8 | 8 | 8 | (8,8) | (8,8) | 8 | 8 | 8 | 8 | (8,8) | (8,8) |
| 9 | 8 | 9 | 23 | 24 | (8,24) | (9,23) | 8 | 9 | 3 | 4 | (8,4) | (9,3) |
| 10 | 8 | 10 | 13 | 15 | (8,15) | (10,13) | 8 | 10 | 13 | 15 | (8,15) | (10,13) |
| 11 | 15 | 11 | 5 | 1 | (15,1) | (11,5) | 15 | 11 | 25 | 21 | (15,21) | (11,25) |
| 12 | 15 | 12 | 20 | 17 | (15,17) | (12,20) | 15 | 12 | 20 | 17 | (15,17) | (12,20) |
| 13 | 15 | 13 | 10 | 8 | (15,8) | (13,10) | 15 | 13 | 10 | 8 | (15,8) | (13,10) |
| 14 | 15 | 14 | 25 | 24 | (15,24) | (14,25) | 15 | 14 | 5 | 4 | (15,4) | (14,5) |
| 15 | 15 | 15 | 15 | 15 | (15,15) | (15,15) | 15 | 15 | 15 | 15 | (15,15) | (15,15) |
| 16 | 17 | 16 | 2 | 1 | (17,1) | (16,2) | 17 | 16 | 22 | 21 | (17,21) | (16,22) |
| 17 | 17 | 17 | 17 | 17 | (17,17) | (17,17) | 17 | 17 | 17 | 17 | (17,17) | (17,17) |
| 18 | 17 | 18 | 7 | 8 | (17,8) | (18,7) | 17 | 18 | 7 | 8 | (17,8) | (18,7) |
| 19 | 17 | 19 | 22 | 24 | (17,24) | (19,22) | 17 | 19 | 2 | 4 | (17,4) | (19,2) |
| 20 | 17 | 20 | 12 | 15 | (17,15) | (20,12) | 17 | 20 | 12 | 15 | (17,15) | (20,12) |
| 21 | 24 | 21 | 4 | 1 | (24,1) | (21,4) | 21 | 21 | 21 | 21 | (21,21) | (21,21) |
| 22 | 24 | 22 | 19 | 17 | (24,17) | (22,19) | 21 | 22 | 16 | 17 | (21,17) | (22,16) |
| 23 | 24 | 23 | 9 | 8 | (24,8) | (23,9) | 21 | 23 | 6 | 8 | (21,8) | (23,6) |
| 24 | 24 | 24 | 24 | 24 | (24,24) | (24,24) | 21 | 24 | 1 | 4 | (21,4) | (24,1) |
| 25 | 24 | 25 | 14 | 15 | (24,15) | (25,14) | 21 | 25 | 11 | 15 | (21,15) | (25,11) |

FIG. 14

| $W_{jk}$ | GLOBAL ROW ADDRESS | LOCAL ROW ADDRESS | GLOBAL COLUMN ADDRESS | LOCAL COLUMN ADDRESS |
|---|---|---|---|---|
| 2,19 | 1 | 2 | 4 | 4 |
| 3,9 | 1 | 3 | 2 | 4 |
| 5,14 | 1 | 5 | 3 | 4 |
| 23,6 | 5 | 3 | 2 | 1 |
| 25,11 | 5 | 5 | 3 | 1 |
| 22,16 | 5 | 2 | 4 | 1 |

FIG. 20

| | | |
|---|---|---|
| CYCLE 1 | $\Delta E_j = h_i$ | |
| CYCLE 2 | $\Delta E_j -= h_j$ | FOR j = 1 TO 5 |
| CYCLE 3 | $\Delta E_j -= h_k + W_{jk}$ | |
| CYCLE 4 | $\Delta E_j += h_l - W_{il}$ | |
| CYCLE 5 | | |
| CYCLE 6 | PROCESSING SAME AS ABOVE | FOR j = 6 TO 10 |
| CYCLE 7 | | |
| CYCLE 8 | | |
| CYCLE 9 | | |
| CYCLE 10 | PROCESSING SAME AS ABOVE | FOR j = 11 TO 15 |
| CYCLE 11 | | |
| CYCLE 12 | | |
| CYCLE 13 | | |
| CYCLE 14 | PROCESSING SAME AS ABOVE | FOR j = 16 TO 20 |
| CYCLE 15 | | |
| CYCLE 16 | | |
| CYCLE 17 | | |
| CYCLE 18 | PROCESSING SAME AS ABOVE | FOR j = 21 TO 25 |
| CYCLE 19 | | |
| CYCLE 20 | | |

TIME ↓

OPTIMIZATION DEVICE AND OPTIMIZATION METHOD

CROSS-REFERENCE TO RELATED APPLICATION

This application is based upon and claims the benefit of priority of the prior Japanese Patent Application No. 2020-55373, filed on Mar. 26, 2020, the entire contents of which are incorporated herein by reference.

FIELD

The embodiments relate to an optimization device and an optimization method.

BACKGROUND

There is an Ising device (also called Boltzmann machine) that uses an Ising-type evaluation function (also called energy function or the like) as a device that calculates a large-scale discrete optimization problem that Neumann computers are not good at.

In the calculation by the Ising device, the problem to be calculated is replaced with an Ising model, which is a model representing a spin behavior of magnetic material. Then, a Markov chain Monte Carlo method such as a pseudo-blurring method or a replica exchange method (also called exchange Monte Carlo method) is used to search for a state where a value of the Ising model-type evaluation function (corresponding to energy of the Ising model) is minimized.

Conventionally, there is an optimization device that searches for a state where the energy is minimized by performing the Markov chain Monte Carlo method using a digital circuit. The conventional optimization device calculates an energy change amount (hereinafter may also be called energy change) assuming that only one state variable value changes at a time, and determines whether or not to allow a bit change depending on a value obtained by adding a noise value corresponding to the temperature to the energy change. A change in the state variable value that increases energy is also allowed with a predetermined probability, and the probability decreases as the temperature decreases.

By the way, some optimization problems have a constraint (1-hot constraint) in which the number of state variables with a value of 1, among a plurality of state variables included in the evaluation function, is only one. There are some 1-hot constraints in which a sum of state variable values included in each row and each column becomes 1 when $N^2$ state variables are arranged in a matrix of N rows and N columns. Hereinafter, such a 1-hot constraint is referred to as a 2-Way 1-hot constraint. For example, when $x_1$ to $x_9$ are arranged in a matrix of 3 rows and 3 columns, the constraint of $x_1+x_2+x_3=1$, $x_4+x_5+x_6=1$, $x_7+x_8+x_9=1$, $x_1+x_4+x_7=1$, $x_2+x_5+x_8=1$, $x_3+x_6+x_9=1$ is a 2-Way 1-hot constraint. A traveling salesman problem, a vehicle allocation planning problem, a secondary allocation problem, and the like have 2-Way 1-hot constraints.

Examples of the related art include Japanese Laid-open Patent Publication No. 7-36473 and Japanese Laid-open Patent Publication No. 2003-263890.

SUMMARY

According to an aspect of the embodiments, provided is an optimization method implemented by a optimization device, the method comprising: calculating a change amount of energy of an Ising model, the change amount being caused when values of four state variables are changed, for each of a plurality of first state variables having a value of 0 before change, so as to satisfy a constraint that a sum of values of state variables included in each row is 1, and a sum of values of state variables included in each column is 1, when N (N is an integer of 2 or larger) squared state variables included in an evaluation function representing the energy of the Ising model are arrayed in N rows and N columns; selecting the four state variables allowed to change on the basis of the change amount calculated for each of the plurality of first state variables, and outputting identification information for identifying the selected four state variables; and updating values of the four state variables allowed to change on the basis of identification information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of changes in a local field and a weighting coefficient used by each ΔE calculation circuit in a case where a state transition as in FIG. 5 has occurred;

FIG. 14 is a diagram illustrating an example of $W_{jk}$ address specification;

FIG. 20 is a diagram illustrating an example of energy change calculated in each cycle in a case of N=5;

DESCRIPTION OF EMBODIMENTS

In a conventional optimization device, the number of state variables that changes at a time is one. For example, the conventional optimization device searches for a ground state having the minimum energy while repeating a state transition with a Hamming distance=1. Therefore, in the conventional optimization device, transition to a state not satisfying the 2-Way 1-hot constraint occurs, and the number of states (search spaces) in which a transition can occur is larger than the number of states satisfying the 2-Way 1-hot constraint. Furthermore, the state transition takes time due to an energy barrier generated by the 2-Way 1-hot constraint. From the above, the conventional optimization device has a problem that it takes time to search for an optimization solution of an optimization problem having the 2-Way 1-hot constraint.

In one aspect of the embodiments, provided is a solution to shorten a calculation time of an optimization problem having a 2-Way 1-hot constraint.

Hereinafter, embodiments will be described with reference to the drawings.

First Embodiment

Figure 1:
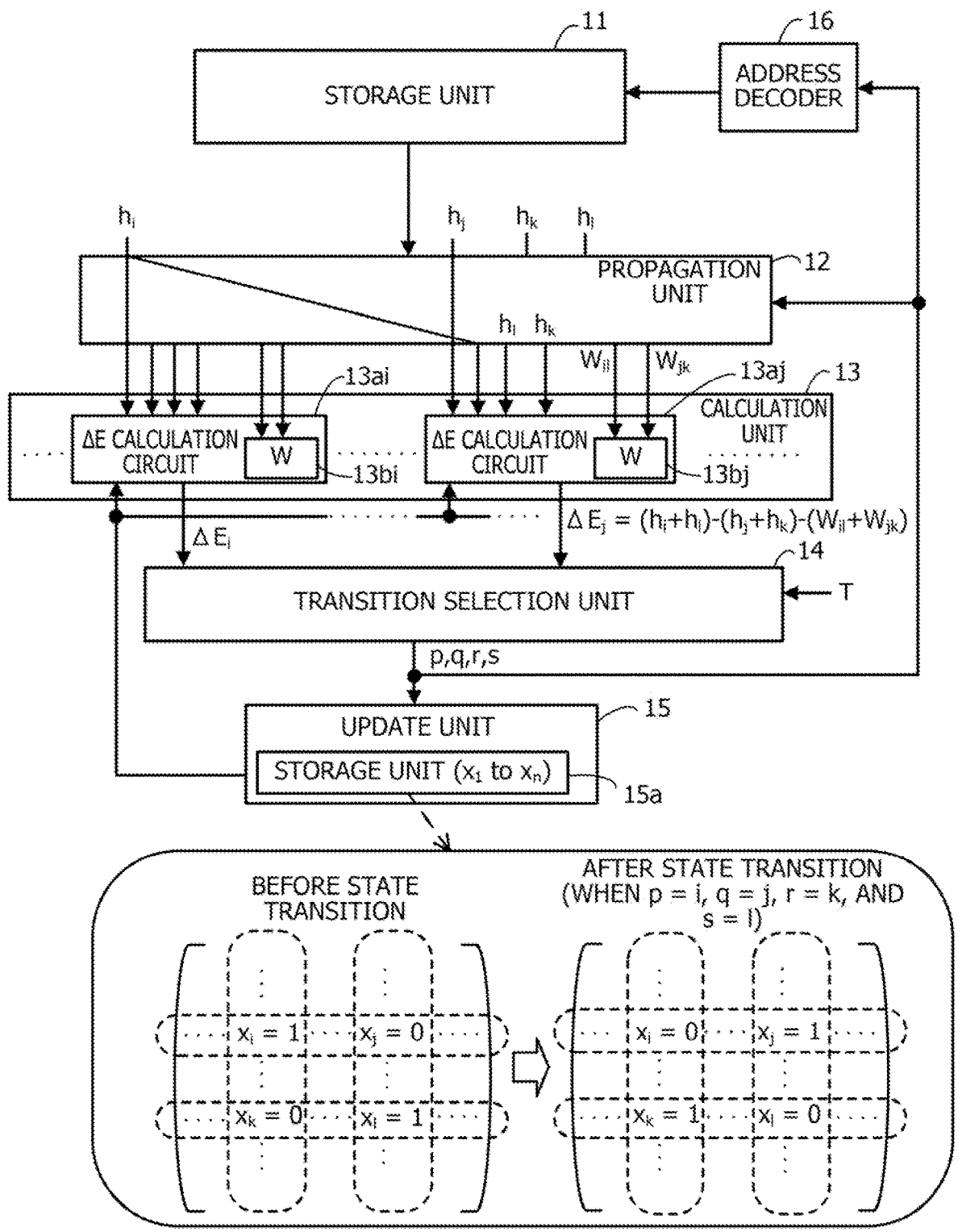
FIG. 1 is a diagram illustrating an example of an optimization device of a first embodiment.

FIG. 1 is a diagram illustrating an example of an optimization device of a first embodiment.

An optimization device 10 shortens a calculation time of an optimization problem having a 2-Way 1-hot constraint by excluding a search for a state other than a state satisfying the 2-Way 1-hot constraint.

The optimization problem is modeled in an Ising model. Energy of the modeled Ising model is defined by, for example, an evaluation function (E(x)) as illustrated in the following equation (1).

$$E(x) = -\sum_{\langle i,j \rangle} W_{ij} x_i x_j - \sum_{i=1} b_i x_i + c \quad (1)$$

A first term on the right side is obtained by integrating products of values of two state variables with a weighting coefficient without omission and duplication for all of combinations of two state variables that can be selected from all of state variables included in the Ising model. $x_i$ is a state variable with an index=i. $x_j$ is a state variable with an index=j. $W_{ij}$ is a weighting coefficient that indicates a weight (for example, bond strength) between state variables with indexes=i and j. Note that $W_{ii}=0$. Furthermore, in many cases, $W_{ij}=W_{ji}$ (for example, a coefficient matrix based on weighting coefficients is often a symmetric matrix).

A second term on the right side is a sum of products of a bias coefficient of each of all the state variables and the state variable value. $b_i$ indicates the bias coefficient for the state variable with the index=i. c is a constant.

For example, "−1" of a spin in the Ising model corresponds to a value of "0" of the state variable. A value "+1" of a spin in the Ising model corresponds to a value of "1" of the state variable. For this reason, a state variable can also be called bit that take a value of 0 or 1.

A combination of values of the state variables, which minimizes the value of the equation (1), is a solution (optimal solution) of the problem.

Note that, in the equation (1), when the value of $x_i$ changes and becomes $1-x_i$, an increment of $x_i$ can be expressed as $\Delta x_i = (1-x_i) - x_i = 1 - 2x_i$. An energy change ($\Delta E_i$) associated with this change in the value is expressed by an equation (2) below.

$$\Delta E_i = E(x)|_{x_i \to 1-x_i} - E(x) = -\Delta x_i \left( \sum_j W_{ij} x_j + b_i \right) = -\Delta x_i h_i \quad (2)$$

In the equation (2), when $x_i$ changes from 1 to 0, $\Delta x_i$ becomes −1, and when $x_i$ changes from 0 to 1, $\Delta x_i$ becomes 1. Note that $h_i$ is referred to as a local field, and $\Delta E_i$ is obtained by multiplying $h_i$ by a code (+1 or −1) depending on $\Delta x_i$. In other words, $h_i$ represents the magnitude of the energy change of the Ising model due to the change of $x_i$ by one.

A change amount in $h_i$ of when $x_j$ changes from 0 to 1 is $\Delta h_i^{(j)} = +W_{ij}$, and the change amount in $h_i$ of when $x_j$ changes from 1 to 0 is $\Delta h_i^{(j)} = -W_{ij}$. Similarly, the change amount in $h_j$ for $x_j$ of when $x_i$ changes can be expressed as $\Delta h_j^{(i)} = \Delta x_i W_{ij}$.

Meanwhile, in a case of excluding searches for states other than the states satisfying the 2-Way 1-hot constraint, values of four state variables are changed in one state transition.

Hereinafter, the state variables of $n=N^2$ (N is an integer equal to or larger than 2) included in the evaluation function is subject to 2-Way 1-hot constraint. By changing the values of four state variables in one state transition to satisfy the constraint that the sum of values of the state variables included in each row and each column becomes 1 when the state variables are arrayed in N rows and N columns, the searches for states other than the states satisfying the 2-Way 1-hot constraint can be excluded.

Note that, in a case where one of the state variables with a value of 0 is selected as a candidate to be updated in the state where the 2-Way 1-hot constraint is satisfied, the state variables of the other three candidates to be updated are determined.

FIG. 1 illustrates an example of a state transition by changing the values of the four state variables ($x_i$, $x_j$, $x_k$, and $x_l$) with the indexes=i, j, k, and l. In a case where $x_j$ that is the state variable with a value of 0 is the candidate to be updated, $x_i$ and $x_l$ that are the state variables with a value of 1, of the state variables included in the same row and the same column as $x_j$, are the candidates to be updated. Moreover, $x_k$ with a value of 0, which is included in the same column as $x_i$ and in the same row as $x_l$, is the candidate to be updated.

$\Delta E_j$ can be expressed by the following equation (3), where the energy change in the Ising model that occurs when the values of these four state variables are changed is $\Delta E_j$.

$$\Delta E_j = (h_i + h_l) - (h_j + h_k) - (W_{il} + W_{jk}) \quad (3)$$

Furthermore, the change amount in the local field ($\Delta h_m$ (m=1, 2, ..., n)) due to the change in $x_i$, $x_j$, $x_k$, and $x_l$ can be expressed by the following equation (4).

$$\Delta h_m = W_{jm} + W_{km} - (W_{im} + W_{lm}) \quad (4)$$

The optimization device 10 that changes the values of the four state variables in one state transition includes, for example, as illustrated in FIG. 1, a storage unit 11, a propagation unit 12, a calculation unit 13, a transition selection unit 14, and an update unit 15, and an address decoder 16. Note that, in FIG. 1, a circuit for updating the local field according to the equation (4), a control unit for controlling the magnitude of a temperature parameter (T) to be described below, and the like are not illustrated.

The storage unit 11 stores a plurality of weighting coefficients included in the evaluation function of the equation (1). The storage unit 11 is implemented using, for example, an electronic circuit such as a static random access memory (SRAM), a synchronous dynamic random access memory (SDRAM), or a high bandwidth memory (HBM).

The propagation unit 12 propagates any of $N^2$ local fields, which are to be used by a plurality of $\Delta E$ calculation circuits included in the calculation unit 13 for calculating the energy change, to each of the plurality of $\Delta E$ calculation circuits on the basis of identification information to be described below output by the transition selection unit 14. Furthermore, the propagation unit 12 propagates the weighting coefficients, which are to be used for energy change by the plurality of $\Delta E$ calculation circuits, to the plurality of respective $\Delta E$ calculation circuits on the basis of the identification information.

The propagation unit 12 is implemented using electronic circuits such as one or a plurality of buses, a plurality of switches, and a control circuit for controlling the switches. An example of the propagation unit 12 will be described below.

The calculation unit 13 calculates the energy change in the Ising model that occurs in the case of changing the values of four state variables to satisfy the 2-Way 1-hot constraint, for each of a plurality of state variables with a value of 0 before the change. The calculation unit 13 includes a plurality of $\Delta E$ calculation circuits (for example, $\Delta E$ calculation circuits 13ai and 13aj). For example, $N^2$ $\Delta E$ calculation circuits are provided respectively corresponding to $N^2$ state variables. For example, the $\Delta E$ calculation circuit 13aj calculates $\Delta E_j$ as illustrated in the equation (3) in a case where $x_j$ is 0.

Furthermore, each of the plurality of $\Delta E$ calculation circuits may include a storage unit (for example, a storage unit 13bi or 13bj) that reads the weighting coefficient ($W_{il}$ or $W_{jk}$ in the equation (3)) to be used for calculating $\Delta E_j$ as illustrated in the equation (3) from the storage unit 11 in advance and stores the read weighting coefficient.

Note that the $\Delta E$ calculation circuit corresponding to the state variable with a value of 1 outputs a predetermined positive value as the energy change in order to suppress occurrence of meaningless state transitions. The predetermined positive value is, for example, a positive maximum value that can be generated by the optimization device 10. For example, in a case where the optimization device 10 can generate a 26-bit value, the positive maximum value is 01 . . . 1 (the number of 1s is twenty five) when expressed by two's complement. Each $\Delta E$ calculation circuit reads the value of the state variable corresponding thereto from a storage unit 15a, and determines whether to calculate the energy change as illustrated in the equation (3) or to output the above positive value.

The calculation unit 13 is implemented using electronic circuits such as an addition circuit, a multiplication circuit (a circuit for multiplying a code of +1 or −1), and a memory (for example, a register or SRAM).

The transition selection unit 14 selects the four state variables that are allowed to change on the basis of the energy changes calculated by the calculation unit 13, and outputs the identification information (indexes) for identifying the selected four state variables (p, q, r, and s in the example in FIG. 1).

The transition selection unit 14 probabilistically accepts the changes in the four state variables in a manner of giving priority to the changes in the four state variables that cause a negative energy change when the value changes, of the plurality of energy changes output by the calculation unit 13. Changes in the four state variables that cause a positive energy change are also probabilistically allowed.

For example, the transition selection unit 14 compares a noise value generated on the basis of the temperature parameter (T) and a uniform random number input from a control unit (not illustrated) with each of the plurality of energy changes output by the calculation unit 13. In a case where a pseudo-blurring method is performed, T is controlled to have a smaller value, and an absolute value of the noise value also becomes smaller, every time state update processing of updating the state of the Ising model is repeated by the control unit a predetermined number of times, for example. The transition selection unit 14 selects the energy change smaller than the noise value, and acquires the index of the energy change. For example, the transition selection unit 14 acquires the index=j in the case of selecting $\Delta E_j$. The index is held in each $\Delta E$ calculation circuit, for example, and the transition selection unit 14 may acquire the held index, or the transition selection unit 14 may generate the index. Note that, in a case where there is a plurality of energy changes smaller than the noise value, the transition selection unit 14 selects one of the energy changes according to a predetermined rule or at random, for example.

In the case of acquiring one index, the transition selection unit 14 generates the other three indexes. For example, in the case where the index=j is acquired, the indexes=i and l of $x_i$ and $x_l$ that are the state variables with a value of 1, of the state variables included in the same row and the same column as $x_j$, and the index=k of $x_k$ included in the same column as $x_l$ and the same row as $x_i$ are generated. Note that k can be calculated by k=i+l−j.

The transition selection unit 14 may generate the other three indexes on the basis of values of state variables (to which identification information indicating which row or column the state variables belong to is assigned) stored in the storage unit 15a to be described below, for example. Furthermore, the transition selection unit 14 may store a hot bit management table that manages the indexes of the state variables (hot bits) with a value of 1, of the state variables in each row and each column, and may generate the two indexes corresponding to the above i and l on the basis of the table. In that case, the transition selection unit 14 generates the index corresponding to the above k by the above equation (k=i+l−j).

The transition selection unit 14 is implemented using, for example, a random number generator, a circuit that generates the noise value based on the temperature parameter (T), a comparator, a selector, a storage unit (for example, a register or SRAM) that stores the hot bit management table, an adder, and the like.

The update unit 15 includes the storage unit 15a that stores the values of $x_1$ to $x_n$. The transition selection unit 14 outputs information to the update unit 15.

The update unit 15 is implemented using, for example, an electronic circuit such as a circuit that inverts the value of the state variable specified by the index from 0 to 1 or 1 to 0, a register, an SRAM, or the like.

The address decoder 16 specifies an address of the storage unit 11 that stores the weighting coefficients to be used for calculating $\Delta E$ in the calculation unit 13 on the basis of the indexes=p, q, r, and s. The address decoder 16 can be implemented using electronic circuits such as various logic circuits.

Note that the above elements may be mounted on a one-chip semiconductor integrated circuit, or may be partially implemented by one bit. For example, in a case where the scale of a problem is large, the storage unit 11 that stores a large number of weighting coefficients may be provided outside the chip.

Hereinafter, an operation example of the optimization device 10 will be described.

First, initial settings are performed. In the initial settings, for example, the values of $x_1$ to $x_n$ in N rows and N columns are set such that the sum of the values of the state variables included in each row and each column becomes 1 under the control of the control unit (not illustrated). Moreover, as the initial settings, processing of storing the weighting coefficients according to initial values of $x_1$ to $x_n$ in the storage units 13bi and 13bj, setting initial values of the local fields according to the initial values of $x_1$ to $x_n$, setting temperature parameters, setting the number of repetitions of the state update processing, and the like are performed.

Then, each $\Delta E$ calculation circuit calculates the energy change or outputs a predetermined positive value as described above, and the transition selection unit 14 selects the four state variables allowed to change and outputs the indexes=p, q, r, and s for identifying the selected four state variables.

The update unit 15 receives the indexes=p, q, r, and s and changes the values of the state variables specified by these indexes. Furthermore, the address decoder 16 specifies the address of the storage unit 11 that stores the weighting coefficients to be used for calculating the energy change next time and the weighting coefficients for updating the local fields on the basis of the indexes, so that these weighting coefficients are read out.

The weighting coefficients to be used for calculating the energy change, of the read weighting coefficients, are stored in any of the storage units of the plurality of $\Delta E$ calculation circuits via the propagation unit 12. Furthermore, the local field is updated using the weighting coefficient read for updating the local field, and the updated local field is propagated to any of the plurality of $\Delta E$ calculation circuits by the propagation unit 12. Then, each $\Delta E$ calculation circuit calculates the energy change or outputs the above predetermined positive value.

For example, in a case where $x_j$ is 0, $x_i$ in the same row as $x_j$ is 1, $x_l$ in the same column as $x_j$ is 1, and $x_k$ in the same column as $x_i$ and in the same row as $x_l$ is 0, $W_{ij}$ and $W_{jk}$ are propagated and stored in the storage unit 13bj of the $\Delta E$ calculation circuit 13aj. Moreover, $h_i$, $h_j$, $h_k$, and $h_l$ are propagated to the $\Delta E$ calculation circuit 13aj. Then, the $\Delta E$ calculation circuit 13aj calculates $\Delta E_j$ as illustrated in the equation (3). Similar processing is performed in the $\Delta E$ calculation circuit corresponding to another state variable ($x_k$ or the like) with a value of 0.

Meanwhile, the $\Delta E$ calculation circuit 13ai corresponding to $x_i$ with a value of 1 outputs a predetermined positive value as the energy change. Note that the $\Delta E$ calculation circuit corresponding to another state variable ($x_l$ or the like) with a value of 1 similarly outputs a predetermined positive value.

Hereinafter, similar processing is repeated. For example, in the case where the pseudo-blurring method is performed, the value of the temperature parameter becomes smaller according to a predetermined temperature change schedule every time the state update processing is completed a predetermined number of repetitions. Then, for example, the state ($x_1$ to $x_n$) at the time when the value of the temperature parameter reaches a minimum value is output as a solution.

The optimization device 10 according to the first embodiment determines which changes of four state variables are allowed on the basis of the energy change of when the four state variables change together to satisfy the 2-Way 1-hot constraint. Then, the values of the determined four state variables are updated. As a result, state transitions not satisfying the 2-Way 1-hot constraint are suppressed, and the search space can be reduced. Therefore, the calculation time of the optimization problem having the 2-Way 1-hot constraint can be shortened.

Furthermore, since a constraint term that increases the energy when the 2-Way 1-hot constraint is not satisfied can be reduced from the evaluation function, the number of bits of weighting coefficients for representing such a constraint term can be reduced, and the hardware for storing the weighting coefficients can be reduced.

Second Embodiment

Figure 2:
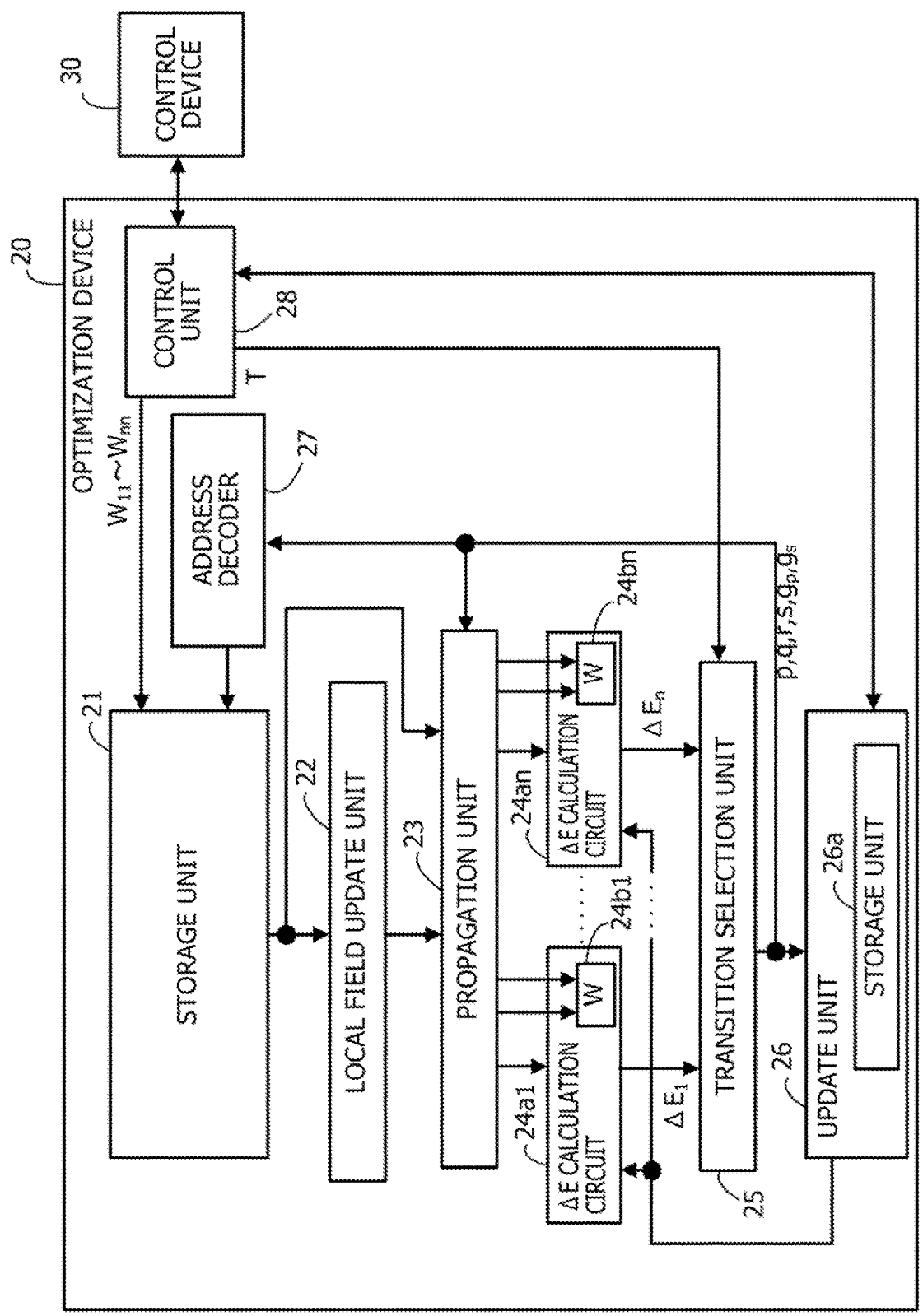
FIG. 2 is a diagram illustrating an example of an optimization device of a second embodiment.

FIG. 2 is a diagram illustrating an example of an optimization device of a second embodiment.

An optimization device 20 of the second embodiment includes a storage unit 21, a local field update unit 22, a propagation unit 23, $\Delta E$ calculation circuits 24a1 to 24an, a transition selection unit 25, an update unit 26, an address decoder 27, and a control unit 28.

The storage unit 21, the propagation unit 23, the $\Delta E$ calculation circuits 24a1 to 24an, the transition selection unit 25, the update unit 26, and the address decoder 27 have similar functions to the elements of the same names in the optimization device 10 illustrated in FIG. 1. Note that, in the following example, the transition selection unit 25 outputs an index=$g_p$ for identifying a row to which $x_p$ with a value of 1 belongs and an index=$g_s$ for identifying a column to which $x_s$ with a value of 1 belongs, in addition to indexes=p, q, r, and s.

The local field update unit 22 updates a local field according to an equation (4), using weighting coefficients read from the storage unit 21. The local field update unit 22 is implemented using, for example, electronic circuits such as a resistor that stores $h_1$ to $h_n$ corresponding to $x_1$ to $x_n$, and a circuit that respectively adds or subtracts four weighting coefficients to or from the stored $h_1$ to $h_n$ respectively.

The control unit 28 performs initial setting processing to be described below of the optimization device 20. Furthermore, in a case where a pseudo-blurring method is performed, the control unit 28 makes a value of a temperature parameter smaller according to a temperature change schedule specified by a control device 30, for example, every time state update processing is repeated a predetermined number of times.

Moreover, the control unit 28 acquires a state ($x_1$ to $x_n$) at the time when the value of the temperature parameter reaches a minimum value from a storage unit 26a of the update unit 26, and transmits the acquired state to the control device 30 as a solution, for example. Note that, in a case where the storage unit 26a of the update unit 26 holds the minimum energy or the state at the time of the minimum energy, the control unit 28 may acquire and transmit information thereof to the control device 30 after the state update processing is repeated the predetermined number of times.

The control unit 28 can be implemented by electronic circuits, for example, an application specific integrated circuit (ASIC), a field programmable gate array (FPGA), and the like. Note that the control unit 28 may be a processor such as a central processing unit (CPU) or a graphics processing unit (GPU). In that case, the processor performs the above-described processing by executing a program stored in a memory (not illustrated).

(Example of Propagation Unit 23)

Figure 3:
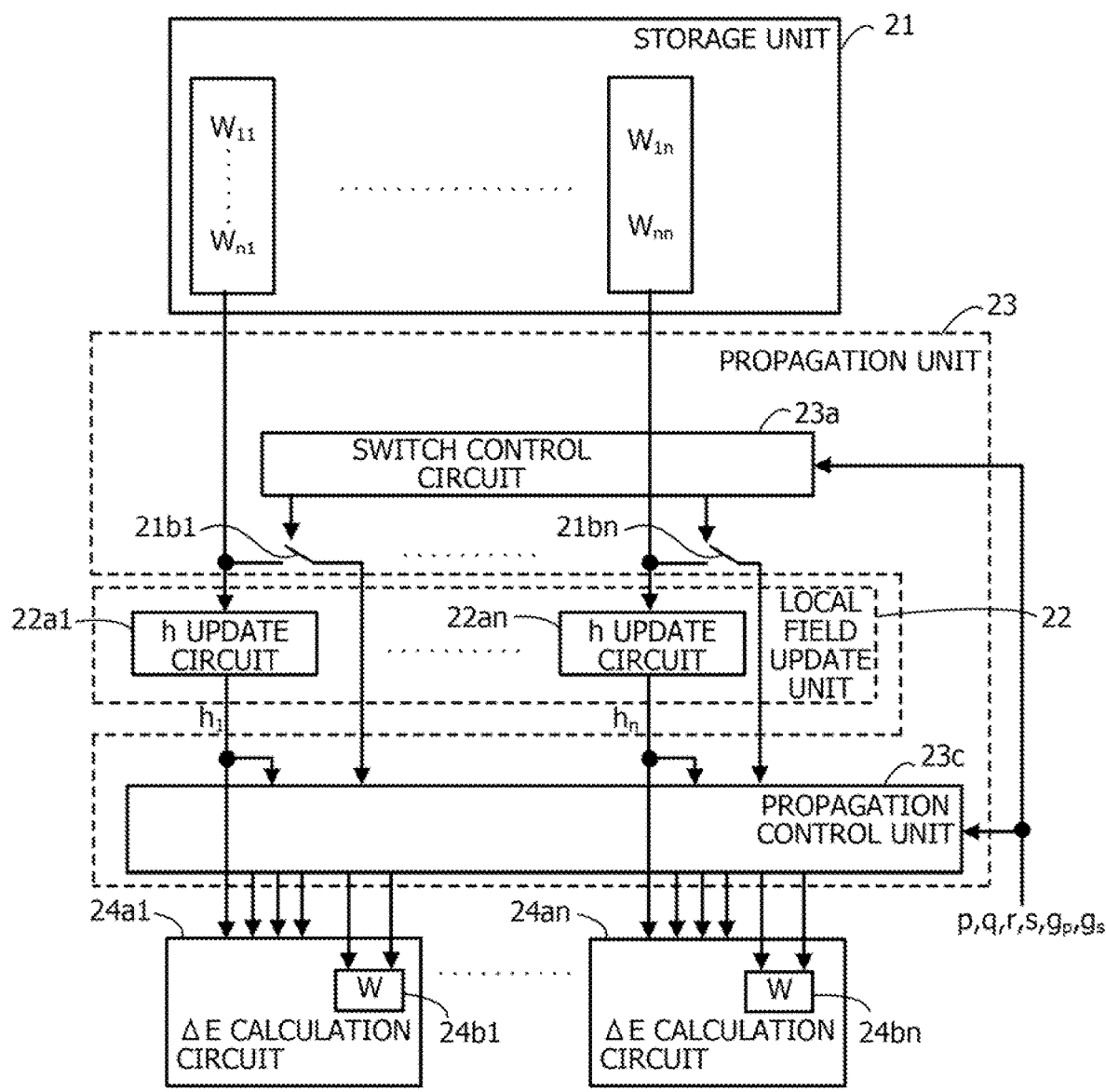
FIG. 3 is a diagram illustrating an example of a propagation unit.

FIG. 3 is a diagram illustrating an example of a propagation unit. Note that FIG. 3 also illustrates an example of the local field update unit 22. The propagation unit 12 illustrated in FIG. 1 can also be implemented by a similar configuration to the example of the propagation unit 23 to be described below.

The propagation unit 23 includes a switch control circuit 23a, switches 21b1 to 21bn, and a propagation control unit 23c.

The switch control circuit 23a controls on/off of the switches 21b1 to 21bn on the basis of indexes=p, q, r, s, $g_p$, and $g_s$. The switch control circuit 23a may include a memory for storing a hot bit management table as described above. In that case, the switch control circuit 23a generates control signals for the switches 21b1 to 21bn on the basis of the hot bit management table. The hot bit management table is updated on the basis of the indexes=p, q, r, s, $g_p$, and $g_s$. A control example of the switches 21b1 to 21bn will be described below.

When the switches 21b1 to 21bn are on, weighting coefficients read from the storage unit 21 are transmitted to the propagation control unit 23c.

The propagation control unit 23c propagates any of $h_1$ to $h_n$ output by h update circuits 22a1 to 22an included in the local field update unit 22 to each of the $\Delta E$ calculation circuits 24a1 to 24an on the basis of the indexes=p, q, r, s, $g_p$, and $g_s$. Furthermore, the propagation control unit 23c propagates any of the weighting coefficients supplied via the switches 21b1 to 21bn to each of the $\Delta E$ calculation circuits 24a1 to 24an on the basis of the indexes=p, q, r, s, $g_p$, and $g_s$.

Figure 4:
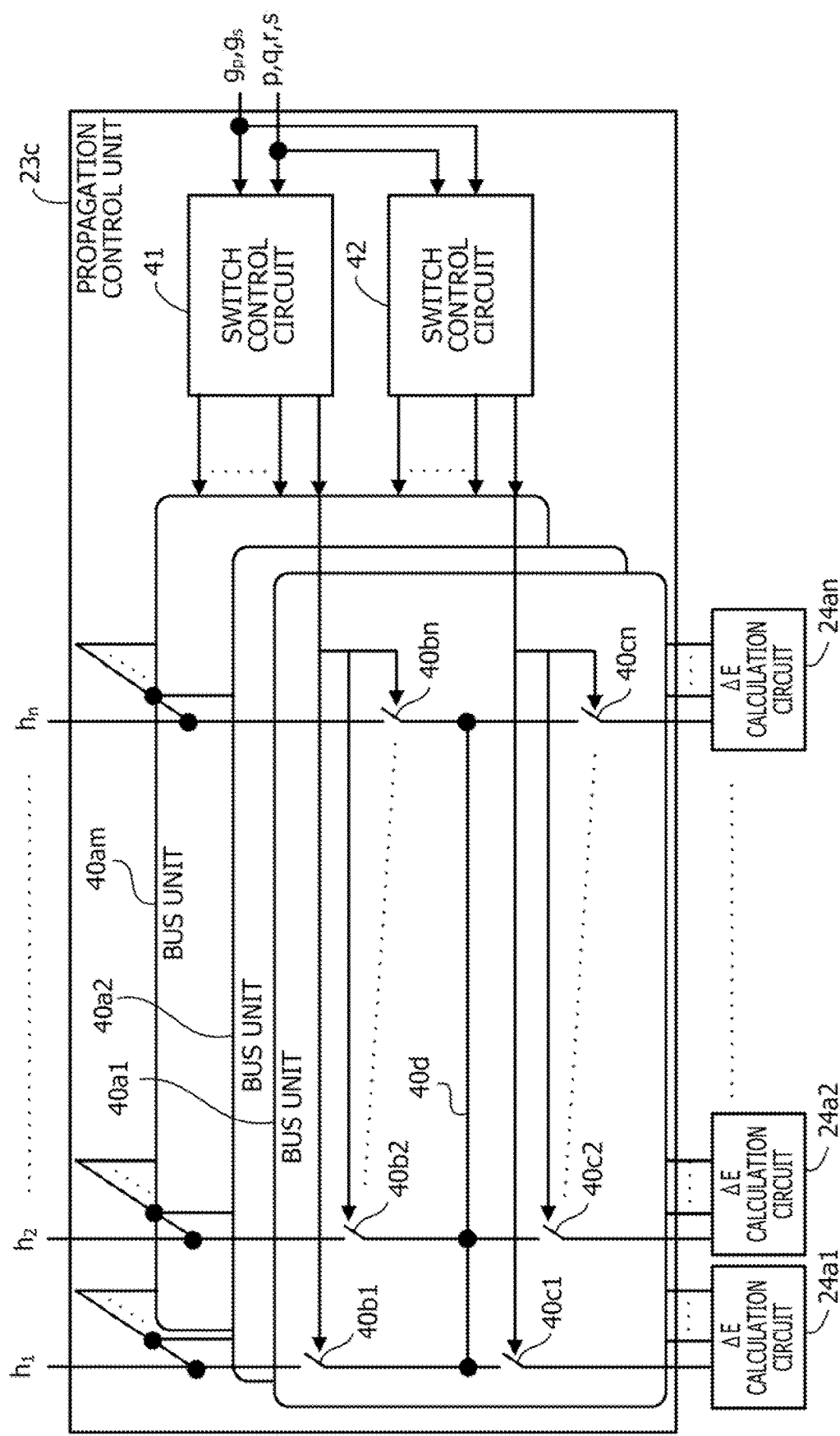
FIG. 4 is a diagram illustrating an example of a propagation control unit.

FIG. 4 is a diagram illustrating an example of the propagation control unit.

The propagation control unit 23c includes bus units 40a1, 40a2, . . . , and 40am and switch control circuits 41 and 42.

The bus unit 40a1 includes switches 40b1, 40b2, . . . , 40bn, 40c1, 40c2, . . . , and 40cn and a bus 40d. The switches 40b1 to 40bn are provided corresponding to $h_1$ to $h_n$, and when any one of the switches 40b1 to 40bn is in an ON state, the local field corresponding to the switch is transmitted to the bus 40d. The switches 40c1 to 40cn are provided corresponding to the $\Delta E$ calculation circuits 24a1, 24a2, . . . , and 24an, and the local field is propagated to the $\Delta E$ calculation circuit corresponding to the switch in the ON state, of the switches 40c1 to 40cn, via the bus 40d. The bus units 40a2 to 40am have a similar configuration to the bus unit 40a1.

The switch control circuit 41 controls on/off of the switches 40b1 to 40bn on the basis of the indexes=p, q, r, s, $g_p$, and $g_s$.

The switch control circuit 42 controls on/off of the switches 40c1 to 40cn on the basis of the indexes=p, q, r, s, $g_p$, and $g_s$.

Note that the propagation control unit 23c may include a memory for storing the hot bit management table as described above. In that case, the switch control circuits 41 and 42 generate control signals for each of the switches on the basis of the hot bit management table. The hot bit management table is updated on the basis of the indexes=p, q, r, s, $g_p$, and $g_s$. Note that the hot bit management table may be the same as that used by the switch control circuit 23a or the like.

In the above example, the number of bus units 40a1 to 40am can be appropriately selected depending on to what extent priority is given to the degree of parallelism in calculation.

Note that FIG. 4 illustrates an example in which the local fields are propagated to the $\Delta E$ calculation circuits 24a1 to 24an. The weighting coefficients can also be propagated to the $\Delta E$ calculation circuits 24a1 to 24an by a similar configuration.

(Propagation Example of Local Field and Weighting Coefficient when n=25)

Hereinafter, propagation of the local fields and the weighting coefficients to the $\Delta E$ calculation circuits 24a1 to 24an will be described taking the case of n=25 (the number of state variables is twenty five) as an example.

Figure 5:
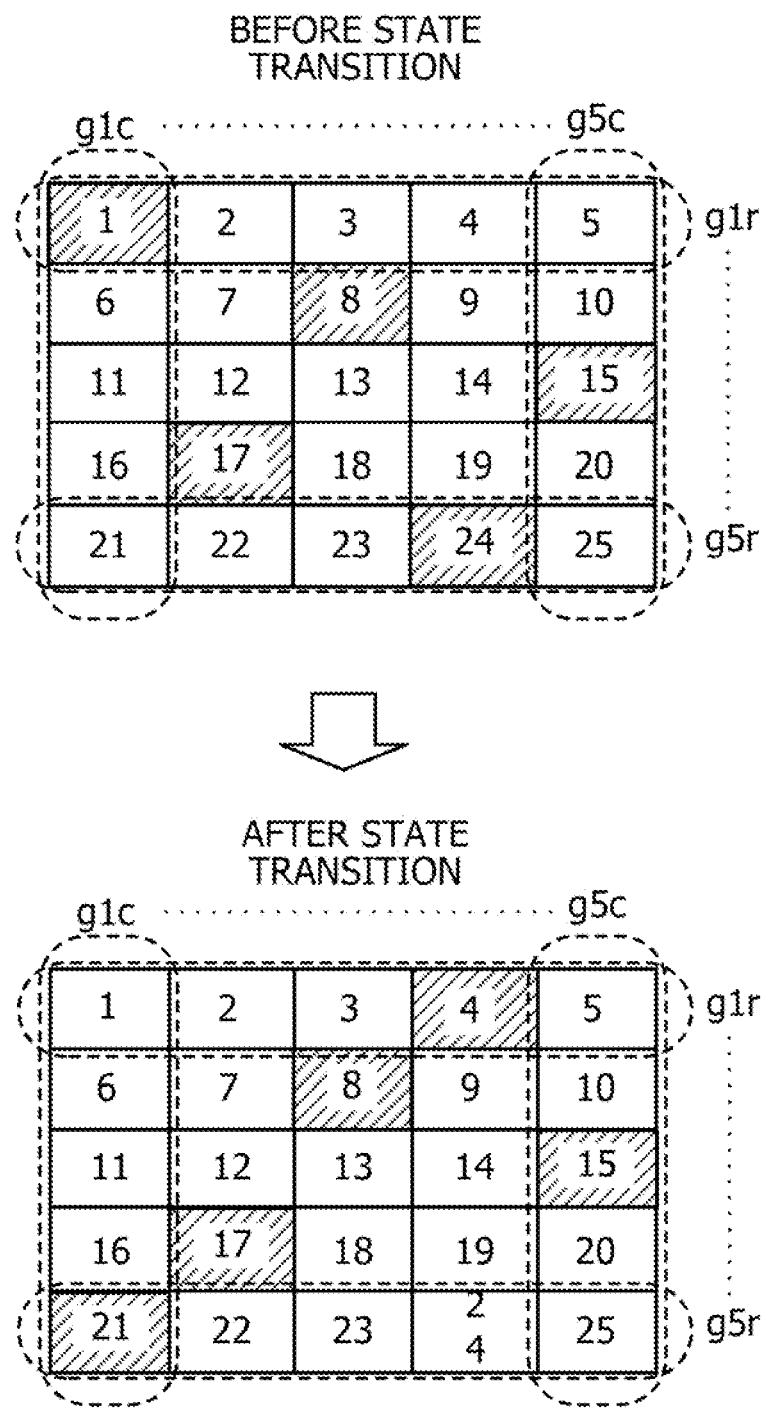
FIG. 5 is a diagram illustrating an example of a state transition that satisfies a 2-Way 1-hot constraint for twenty-five state variables.

FIG. 5 is a diagram illustrating an example of a state transition that satisfies a 2-Way 1-hot constraint for twenty-five state variables. In FIG. 5, $x_1$ to $x_{25}$ are represented by indexes=1 to 25 for simplification of illustration. g1c to g5c are indexes for identifying columns, and g1r to g5r are indexes for identifying rows. Furthermore, the shaded indexes indicate the indexes of state variables with a value is 1, and the value of the other state variables is 0.

In the example of FIG. 5, values of $x_1$, $x_8$, $x_{15}$, $x_{17}$, and $x_{24}$ are 1. In this example, in a case where $x_4$ is changed from 0 to 1, the value of $x_{24}$ belonging to the same column (the column with the index=g4c) as $x_4$ and having a value of 1 is changed to 0, and the value of $x_1$ belonging to the same row (the row with the index=g1r) as $x_4$ and having a value of 1 is changed to 0. Moreover, the value of $x_{21}$ belonging to the same column (the column with the index=g1c) as $x_1$ and belonging to the same row (the row with the index=g5r) as $x_{24}$ is changed to 1. Thereby, a state transition satisfying a 2-Way 1-hot constraint is implemented.

In a case where the state transition as illustrated in FIG. 5 occurs, the local fields and the weighting coefficients used by the $\Delta E$ calculation circuits 24a1 to 24an for calculating the energy change before and after transition.

FIG. 6 is a diagram illustrating an example of changes in the local field and the weighting coefficient used by each $\Delta E$ calculation circuit in a case where a state transition as in FIG. 5 has occurred. FIG. 6 illustrates $h_i$, $h_j$, $h_k$, $h_l$, $W_{il}$, and $W_{jk}$ before and after the state transition respectively illustrated in FIG. 5, which are used when each of the twenty-five $\Delta E$ calculation circuits 24a1 to 24an calculates the equation (3). Note that the local fields and the weighting coefficients are illustrated by the indexes for simplification of illustration. For example, $h_1$ is illustrated as 1 and $W_{11}$ is illustrated as (1,1).

In the example in FIG. 6, $h_i$, $h_j$, $h_k$, and $h_l$ propagated to the $\Delta E$ calculation circuits corresponding to the hot bits such as $x_1$ and $x_8$ before the state transition are the local fields of indexes same as the indexes of the hot bits. For example, $h_i$, $h_j$, $h_k$, and $h_l$ supplied to the ΔE calculation circuit 24a1 corresponding to $x_1$ that is a hot bit are all $h_1$. Therefore, $W_{il}$ and $W_{jk}$ are both $W_{11}$. The ΔE calculation circuit corresponding to such a hot bit outputs a predetermined positive value as described above.

After the state transition, in the five ΔE calculation circuits corresponding to $x_1$ to $x_5$ belonging to the row with the index=g1r, $x_4$ belonging to the same row is changed from 0 to 1, and thus h is used as $h_i$ instead of $h_1$ before the state transition. In the five ΔE calculation circuits corresponding to $x_6$ to $x_{10}$ belonging to the row with the index=g2r, $h_8$ is used as $h_i$ as before the state transition because the hot bits belonging to the row are not changed. In the ΔE calculation circuits corresponding to the state variables belonging to the rows with the indexes=g3r and g4r, the local field with the same index as before the state transition is used as $h_i$ because the hot bits belonging to those rows are not changed. In the five ΔE calculation circuits corresponding to $x_{21}$ to $x_{25}$ belonging to the row with the index=g5r, $x_{21}$ belonging to the same row is changed from 0 to 1, and thus $h_{21}$ is used as $h_i$ instead of $h_{24}$ before the state transition.

There is no change in $h_j$ before and after the state transition.

Regarding $h_k$, a change may occur before and after the state transition in the ΔE calculation circuits corresponding to the state variables belonging to the row where no hot bit changes. For example, the $h_k$ used by the ΔE calculation circuit corresponding to $x_6$ is changed from $h_3$ to $h_{23}$. Furthermore, the $h_k$ used by the ΔE calculation circuit corresponding to $x_9$ is changed from $h_{23}$ to $h_3$.

Regarding $h_l$, there may be a change before and after the state transition in the ΔE calculation circuits corresponding to the state variables belonging to each row. Note that, regarding $h_l$, $h_l$ used in the ΔE calculation circuits corresponding to the state variables belonging to each row is the same. That is, the $h_l$ used in the ΔE calculation circuits corresponding to the state variables belonging to each row is $h_1$, $h_{17}$, $h_8$, $h_{24}$, and $h_{15}$ before the state transition, and $h_{21}$, $h_{17}$, $h_8$, $h_4$, and $h_{15}$ after the state transition.

As for the weighting coefficients to be used, as described above, some weighting coefficients change and some weighting coefficients do not change with the change of the local fields to be used before and after the state transition.

Hereinafter, a propagation example of the local field and the weighting coefficient to each ΔE calculation circuit after the state transition will be described.

Figure 7:
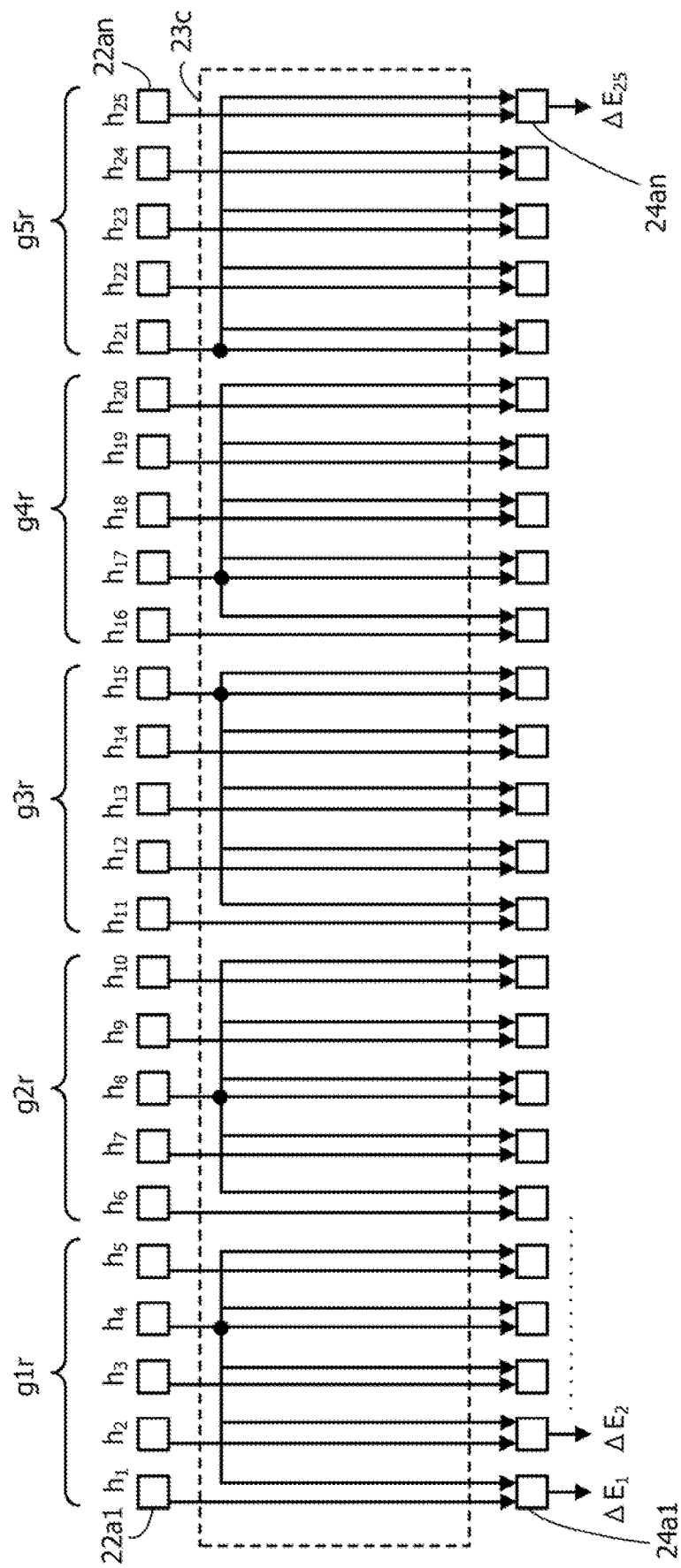
FIG. 7 is a diagram illustrating a propagation example of $h_i$ and $h_j$.

FIG. 7 is a diagram illustrating a propagation example of $h_i$ and $h_j$.

FIG. 7 illustrates a state in which $h_1$ to $h_{25}$ output by the h update circuits 22a1 to 22an are propagated to the ΔE calculation circuits 24a1 to 24an as $h_i$ and $h_j$.

Each of $h_1$ to $h_{25}$ is propagated as $h_j$ to the ΔE calculation circuit corresponding to the state variable having the same index as the h. The propagated $h_j$ does not change before and after the state transition. For example, $h_1$ is propagated to the ΔE calculation circuit 24a1 corresponding to $x_1$, and $h_n$ is propagated to the ΔE calculation circuit 24an corresponding to $x_n$. Therefore, if the ΔE calculation circuits respectively corresponding to the h update circuits 22a1 to 22an are directly connected, $h_j$ can be propagated without using the propagation control unit 23c.

$h_i$ is propagated as follows using the propagation control unit 23c.

$h_4$ is propagated as $h_i$ to the five ΔE calculation circuits corresponding to $x_1$ to $x_5$ belonging to the row with the index=g1r, and $h_8$ is propagated as $h_i$ to the five ΔE calculation circuits corresponding to $x_6$ to $x_{10}$ belonging to the row with the index=g2r. $h_{15}$ is propagated as $h_i$ to the five ΔE calculation circuits corresponding to $x_{11}$ to $x_{15}$ belonging to the row with the index=g3r, and $h_{17}$ is propagated as $h_i$ to the five ΔE calculation circuits corresponding to $x_{16}$ to $x_{20}$ belonging to the row with the index=g4r. Furthermore, $h_{21}$ is propagated as $h_i$ to the five ΔE calculation circuits corresponding to $x_{21}$ to $x_{25}$ belonging to the row with the index=g5r.

In the propagation as described above, the propagation control unit 23c illustrated in FIG. 4 can propagate $h_i$ to each ΔE calculation circuit 24an in one cycle (for example, one dock cycle) in the case of m=5. For example, the bus unit 40a1 transmits $h_4$ to the bus 40d, and propagates $h_4$ from the bus 40d to the five ΔE calculation circuits corresponding to $x_1$ to $x_5$ belonging to the row with the index=g1r. In parallel, the bus units 40a2 to 40am propagate $h_8$, $h_{15}$, $h_{17}$, and $h_{21}$ to the ΔE calculation circuits corresponding to the state variables belonging to the rows with the indexes=g2r to g5r.

Figure 8:
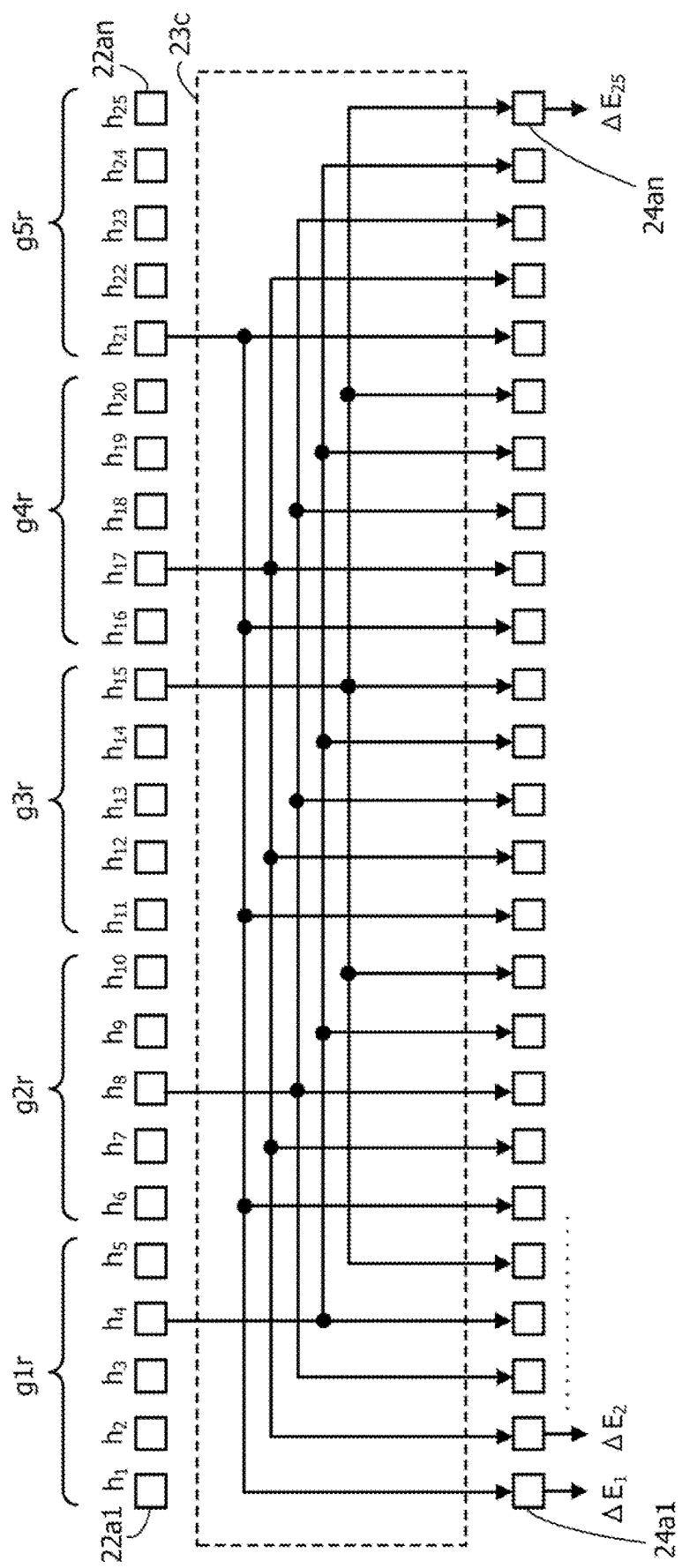
FIG. 8 is a diagram illustrating a propagation example of $h_l$.

FIG. 8 is a diagram illustrating a propagation example of $h_j$.

As illustrated in FIG. 8, each of $h_4$, $h_8$, $h_{15}$, $h_{17}$, and $h_{21}$ propagated as $h_i$ as described above is propagated as $h_j$ to any of the ΔE calculation circuits 24a1 to 24an.

$h_4$ is propagated to the five ΔE calculation circuits corresponding to $x_4$, and $x_9$, $x_{14}$, $x_{19}$, and $x_{24}$ that belong to the same column as $x_4$. $h_8$ is propagated to the five ΔE calculation circuits corresponding to $x_8$, and $x_3$, $x_{13}$, $x_{18}$, and $x_{23}$ that belong to the same column as $x_8$. $h_{15}$ is propagated to the five ΔE calculation circuits corresponding to $x_{15}$, and $x_5$, $x_{10}$, $x_{20}$, and $x_{25}$ that belong to the same column as $x_{15}$. $h_{17}$ is propagated to the five ΔE calculation circuits corresponding to $x_{17}$, and $x_2$, $x_7$, $x_{12}$, and $x_{22}$ that belong to the same column as $x_{17}$. $h_{21}$ is propagated to the five ΔE calculation circuits corresponding to $x_{21}$, and $x_1$, $x_6$, $x_{11}$, and $x_{16}$ that belong to the same column as $x_{21}$.

The propagation of $h_j$ as described above can also be performed in parallel in one cycle using the five bus units 40a1 to 40am.

Figure 9:
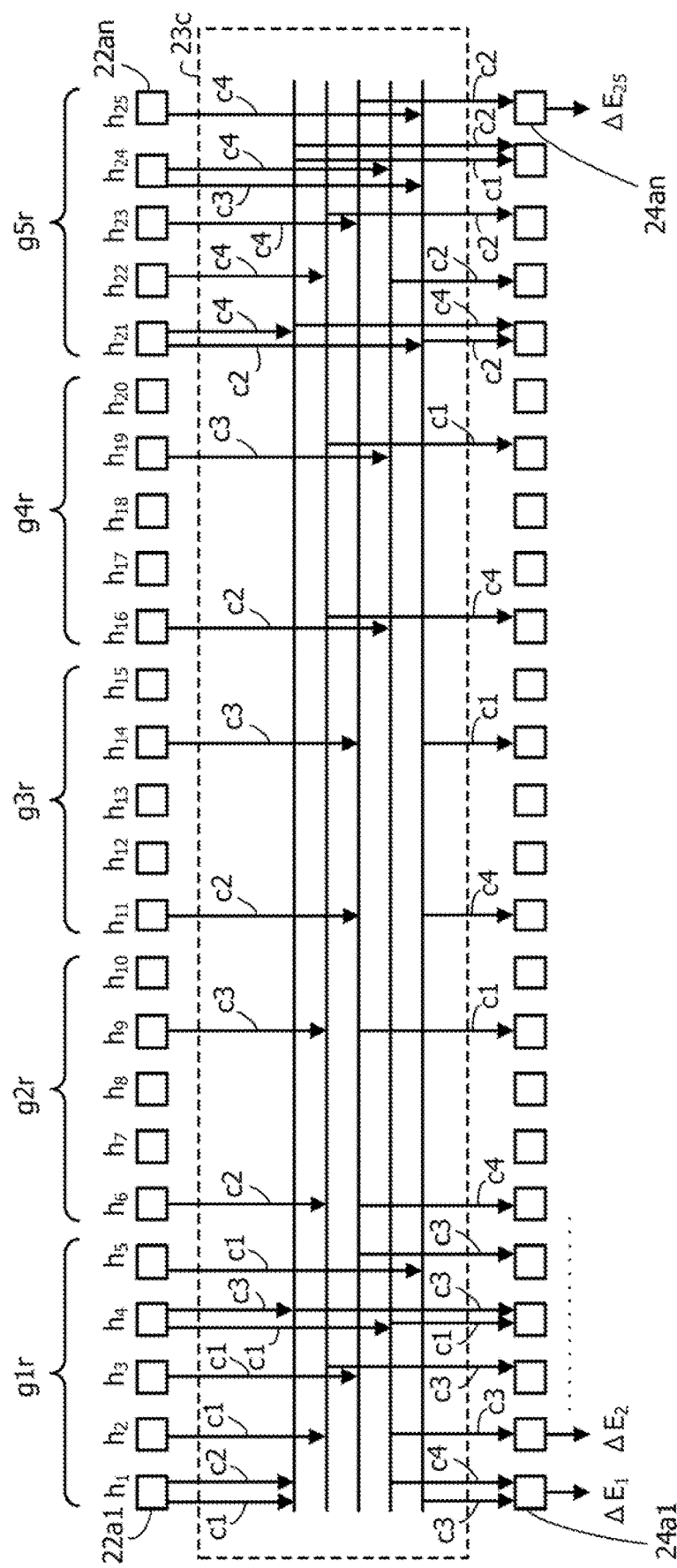
FIG. 9 is a diagram illustrating a propagation example of $h_k$.

FIG. 9 is a diagram illustrating a propagation example of $h_k$.

As for $h_k$, in the state after the state transition as illustrated in FIG. 5, the local fields corresponding the state variables included in the row and column to which $x_4$ belongs and the row and column to which $x_{21}$ belongs are propagated as $h_k$.

The propagation of $h_k$ is performed in four cycles using, for example, the five bus units 40a1 to 40am.

In cycle c1, each of $h_1$ to $h_5$ is transmitted to one of the five buses of the bus units 40a1 to 40am, and $h_1$ to $h_5$ are propagated to the ΔE calculation circuits respectively corresponding to $x_{24}$, $x_{19}$, $x_9$, $x_4$, and $x_{14}$. In cycle c2, each of $h_1$, $h_6$, $h_{11}$, $h_{16}$, and $h_{21}$ is transmitted to one of the five buses, and $h_1$, $h_6$, $h_{11}$, $h_{16}$, and $h_{21}$ are transmitted to the ΔE calculation circuits respectively corresponding to $x_{24}$, $x_{23}$, $x_{25}$, $x_{22}$, and $x_{21}$. In cycle c3, each of $h_4$, $h_9$, $h_{14}$, $h_{19}$, and $h_{24}$ is transmitted to any of the five buses, and $h_4$, $h_9$, $h_{14}$, $h_{19}$, and $h_{24}$ are propagated to the ΔE calculation circuits respectively corresponding to $x_4$, $x_3$, $x_5$, $x_2$, and $x_1$. In cycle c4, each of $h_{21}$, $h_{22}$, $h_{23}$, $h_{24}$, and $h_{25}$ is transmitted to any of the five buses, and $h_{21}$, $h_{22}$, $h_{23}$, $h_{24}$, and $h_{25}$ are propagated to the ΔE calculation circuits respectively corresponding to $x_{21}$, $x_{16}$, $x_6$, $x_1$, and $x_{11}$.

Note that the number of local fields to be propagated as $h_k$ is essentially fourteen of $h_1$, $h_2$, $h_3$, $h_5$, $h_6$, $h_9$, $h_{11}$, $h_{14}$, $h_{16}$, $h_{19}$, $h_{22}$, $h_{23}$, $h_{24}$, and $h_{25}$. This is because $h_4$ and $h_{21}$ are propagated as $h_i$ to the ΔE calculation circuits corresponding to the hot bits $x_4$ and $x_{21}$. Therefore, if these redundant propagations are reduced, $h_k$ can ideally be propagated in three cycles.

Figure 10:
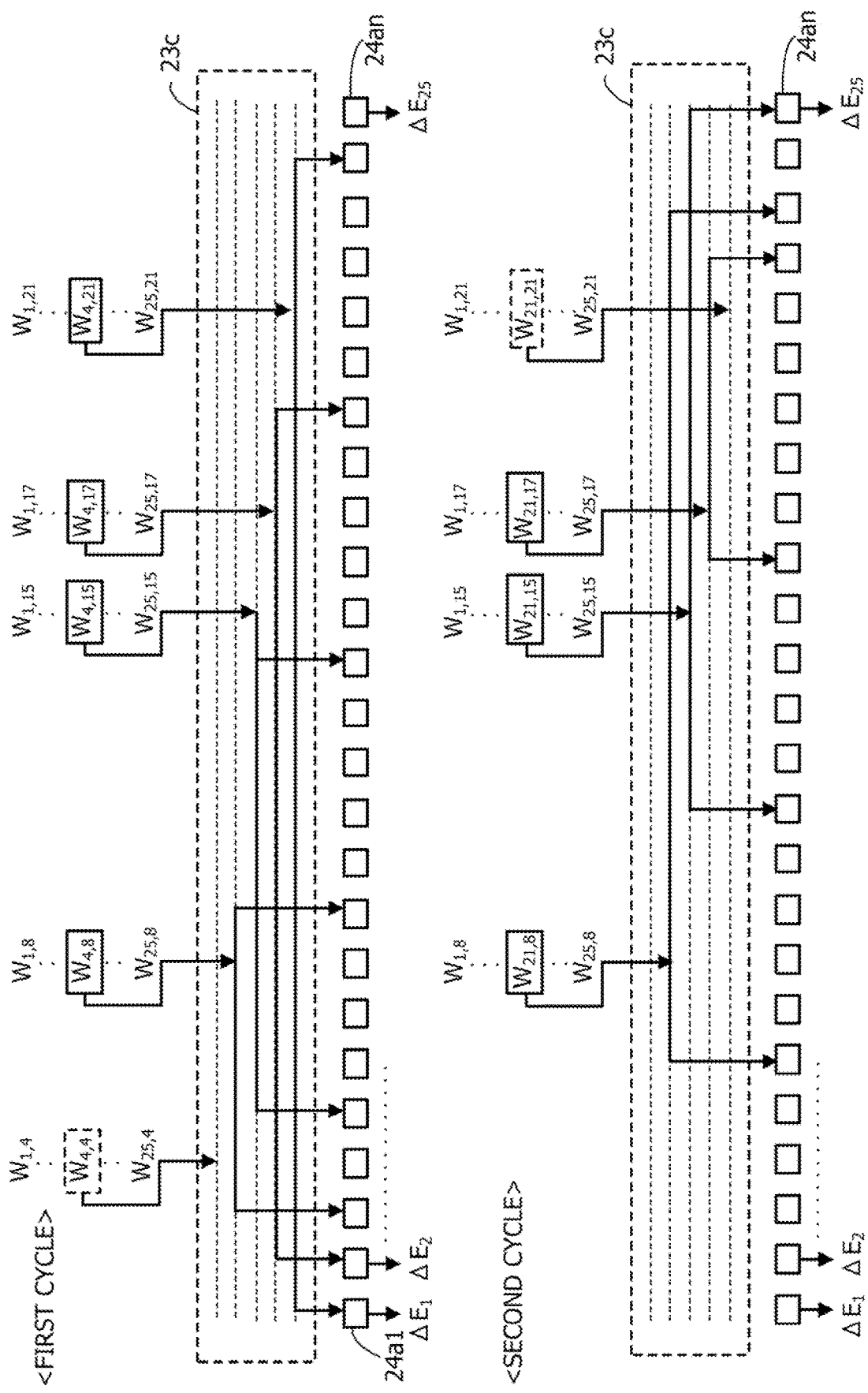
FIG. 10 is a diagram illustrating a propagation example of $W_{il}$.

FIG. 10 is a diagram illustrating a propagation example of $W_{il}$.

As illustrated in FIG. 6, twenty-five $W_{il}$s are used in the twenty-five ΔE calculation circuits 24a1 to 24an after the state transition, and nine out of the twenty-five $W_{il}$s are the same as before the state transition. Furthermore, when $W_{il}=W_{li}$, the number of $W_{il}$s to be propagated is nine. Therefore, $W_{il}$ propagation can be performed in two cycles using, for example, five bus units 40a1 to 40am.

In the first cycle, $W_{4,8}$, $W_{4,15}$, $W_{4,17}$, and $W_{4,21}$ are propagated to the ΔE calculation circuits respectively corresponding to $x_3$ and $x_9$, $x_5$ and $x_{14}$, $x_2$ and $x_{19}$, and $x_1$ and $x_{24}$. Note that, since the ΔE calculation circuit corresponding to $x_4$ outputs a predetermined positive value, $W_{4,4}$ does not need to be propagated to the ΔE calculation circuit. Therefore, in FIG. 10, $W_{4,4}$ is not propagated. However, since processing overhead added to propagate $W_{4,4}$ is small, $W_{4,4}$ may be propagated. For example, there may be a possibility that propagation of $W_{4,4}$ is desirable because the circuit configuration of the propagation control unit 23c is simplified or the like.

In the second cycle, $W_{21,8}$, $W_{2,15}$, and $W_{21,17}$ are propagated to the ΔE calculation circuits respectively corresponding to $x_6$ and $x_{23}$, $x_{11}$ and $x_{25}$, and $x_{16}$ and $x_{22}$. Note that, since the ΔE calculation circuit corresponding to $x_{21}$ outputs a predetermined positive value, $W_{21,21}$ does not need to be propagated to the ΔE calculation circuit. Therefore, in FIG. 10, $W_{21,21}$ is not propagated. Note that $W_{21,21}$ may be propagated for similar reasons to the above.

Figure 11:
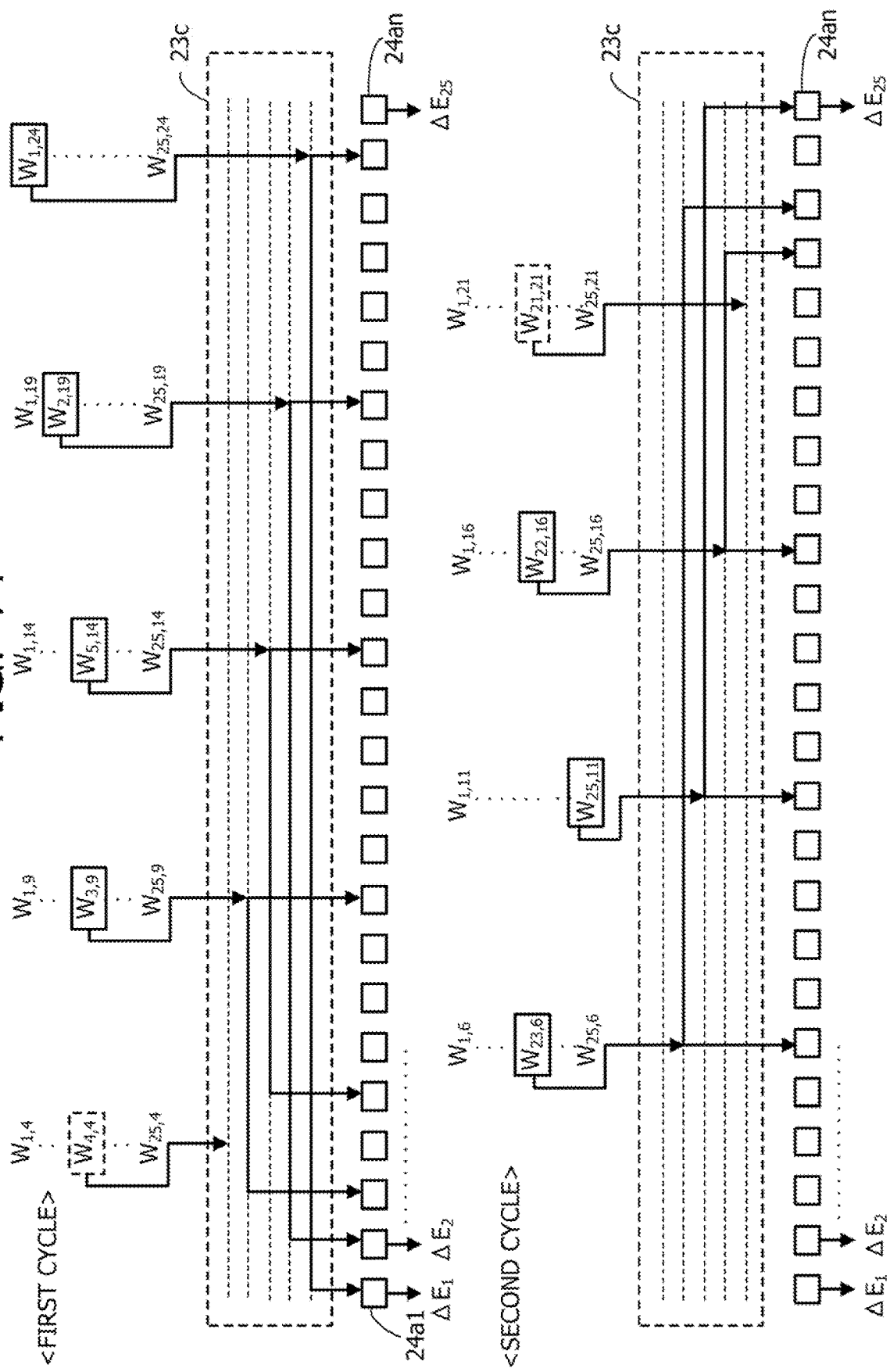
FIG. 11 is a diagram illustrating a propagation example of $W_{jk}$.

FIG. 11 is a diagram illustrating a propagation example of $W_{jk}$.

As illustrated in FIG. 6, twenty-five $W_{jk}$s are used in the twenty-five ΔE calculation circuits 24a1 to 24an after the state transition, and nine out of the twenty-five $W_{jk}$s are the same as before the state transition. Furthermore, when $W_{il}=W_{li}$, the number of $W_{jk}$s to be propagated is nine. Therefore, $W_{jk}$ propagation can be performed in two cycles using, for example, the five bus units 40a1 to 40am.

In the first cycle, $W_{3,9}$, $W_{5,14}$, $W_{2,19}$, and $W_{1,24}$ are propagated to the ΔE calculation circuits respectively corresponding to $x_3$ and $x_9$, $x_5$ and $x_{14}$, $x_2$ and $x_{19}$, and $x_1$ and $x_{24}$.

In the second cycle, $W_{23,6}$, $W_{25,11}$, and $W_{22,16}$ are propagated to the ΔE calculation circuits respectively corresponding to $x_6$ and $x_{23}$, $x_{11}$ and $x_{25}$, and $x_{16}$ and $x_{22}$. Note that, for similar reasons to the above, $W_{4,4}$ and $W_{21,21}$ are not propagated in FIG. 11.

(Example of Reading Weighting Coefficient when n=25)

Next, an efficient method of reading the weighting coefficient from the storage unit 21 will be described.

After the state transition as illustrated in FIG. 5, $W_{1,1}$ to $W_{1,25}$, $W_{4,1}$ to $W_{4,25}$, $W_{21,1}$ to $W_{21,25}$, and $W_{24,1}$ to $W_{24,25}$ are read out for updating the local fields, of the 25×25 weighting coefficients stored in the storage unit 21. Among them, $W_{4,1}$ to $W_{4,25}$ and $W_{21,1}$ to $W_{21,25}$ contain $W_{il}$ to be used.

Figure 12:
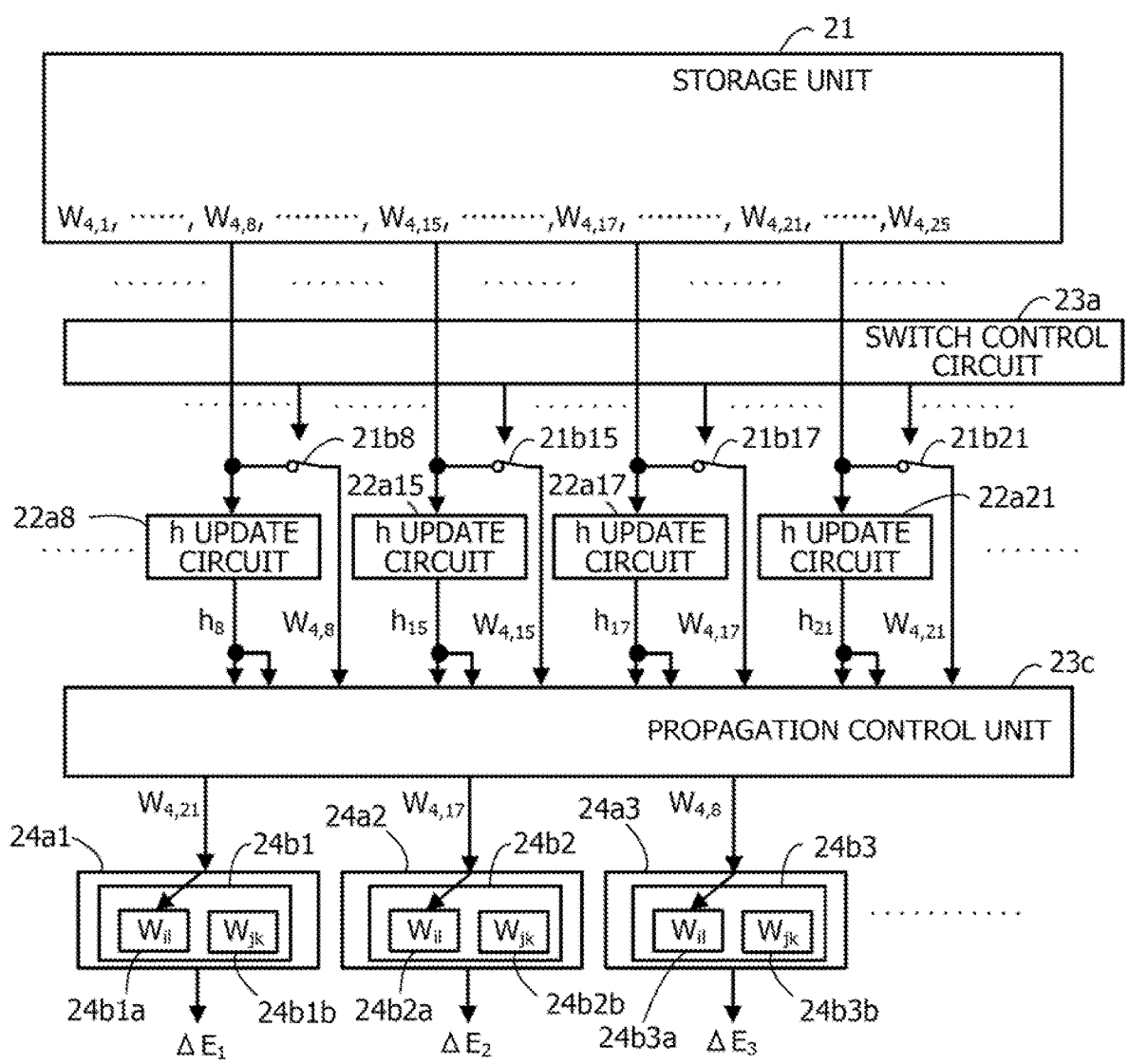
FIG. 12 is a diagram illustrating an example of readout of $W_{il}$ and storage to a storage unit of a ΔE calculation circuit.

FIG. 12 is a diagram illustrating an example of readout of $W_{il}$ and storage to the storage unit of the ΔE calculation circuit.

In the example of FIG. 12, $W_{4,1}$ to $W_{4,25}$ are read from the storage unit 21 for updating the local fields. Thereby, $W_{4,8}$ is supplied to the h update circuit 22a8 for updating $h_8$, and $W_{4,15}$ is supplied to the h update circuit 22a15 for updating $h_{15}$, as $W_{il}$, for example. Furthermore, $W_{4,17}$ is supplied to the h update circuit 22a17 for updating $h_{17}$, and $W_{4,21}$ is supplied to the h update circuit 22a21 for updating $h_{21}$, as $W_{il}$, for example.

At this time, the switch control circuit 23a turns on the switches 21b8, 21b15, 21b17, and 21b21 corresponding to $x_8$, $x_{15}$, $x_{17}$, and $x_{21}$ in which the value after the state transition is 1 on the basis of, for example, the hot bit management table. Although not illustrated, other switches are turned off. Thereby, $W_{4,8}$, $W_{4,15}$, $W_{4,17}$, and $W_{4,21}$ are supplied to the propagation control unit 23c. Note that since readout of $W_{4,4}$ can be omitted for similar reasons to the above, $W_{4,4}$ is not supplied to the propagation control unit 23c in the example in FIG. 12.

Each of $W_{4,8}$, $W_{4,15}$, $W_{4,17}$, and $W_{4,21}$ supplied to the propagation control unit 23c is propagated to any of the ΔE calculation circuits 24a1 to 24an as in the first cycle in FIG. 10.

For example, as illustrated in FIG. 12, $W_{4,21}$ is propagated to the ΔE calculation circuit 24a1 and stored in a storage area 24b1a for storing $W_{il}$ of storage areas 24b1a and 24b1b of a storage unit 24b1. $W_{4,17}$ is propagated to the ΔE calculation circuit 24a2 and stored in a storage area 24b2a for storing $W_{il}$ of storage areas 24b2a and 24b2b of a storage unit 24b2. Furthermore, $W_{4,8}$ is propagated to the ΔE calculation circuit 24a3 and stored in a storage area 24b3a for storing $W_{il}$ of storage areas 24b3a and 24b3b of a storage unit 24b3.

Similarly, the switches 21b8, 21b15, 21b17, and 21b21 are turned on in the case where $W_{21,1}$ to $W_{21,25}$ are read from the storage unit 21 for updating the local fields. Thereby, $W_{21,8}$, $W_{21,15}$, $W_{21,17}$, and $W_{21,21}$ are supplied to the propagation control unit 23c. Note that readout and propagation of $W_{21,21}$ can be omitted for similar reasons to the above.

Then, each of $W_{21,8}$, $W_{21,15}$, and $W_{21,17}$ supplied to the propagation control unit 23c is propagated to any of the ΔE calculation circuits 24a1 to 24an and stored in the storage area for storing $W_{il}$ of the storage unit, as in the second cycle in FIG. 10.

As described above, $W_{il}$ can be read from the storage unit 21 at the same timing as the readout of the weighting coefficient for updating the local field, and does not need to be read from the storage unit 21 again.

Meanwhile, $W_{jk}$ is not included in the weighting coefficients read for updating the local fields, except for $W_{1,24}$, after the state transition as illustrated in FIG. 5. Therefore, $W_{jk}$ other than $W_{1,24}$ is read in a cycle different from readout of $W_{1,1}$ to $W_{1,25}$, $W_{4,1}$ to $W_{4,25}$, $W_{21,1}$ to $W_{21,25}$, and $W_{24,1}$ to $W_{24,25}$.

Figure 13:
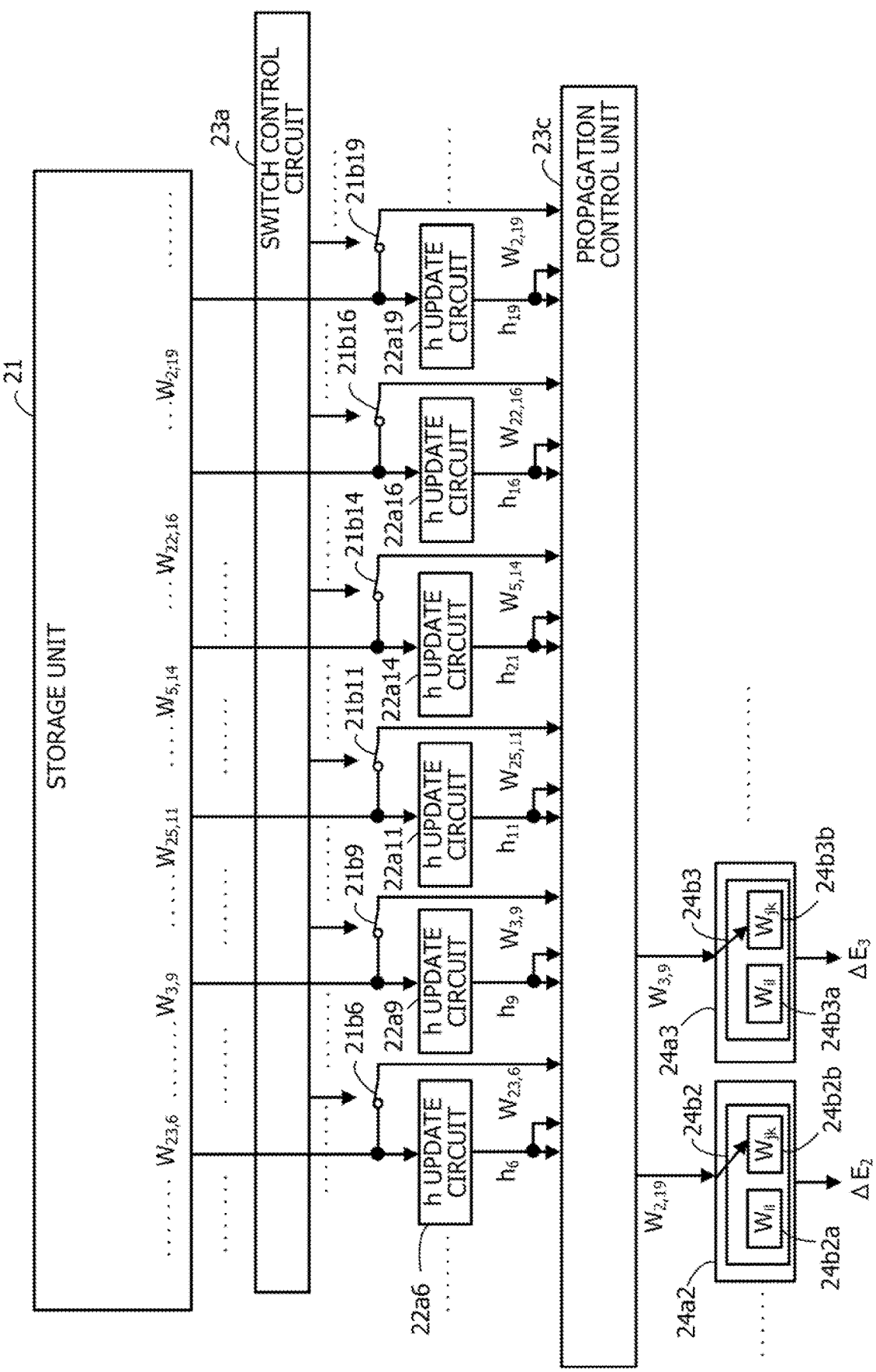
FIG. 13 is a diagram illustrating an example of readout of $W_{jk}$ and storage to a storage unit of a ΔE calculation circuit.

FIG. 13 is a diagram illustrating an example of readout of $W_{jk}$ and storage to the storage unit of the ΔE calculation circuit.

As illustrated in FIG. 6, twenty-five $W_{jk}$s are used in the twenty-five ΔE calculation circuits 24a1 to 24an after the state transition, and nine out of the twenty-five $W_{jk}$s are the same as before the state transition. Furthermore, when $W_{il}=W_{li}$, the number of $W_{jk}$s to be read from the storage unit 21 is nine. However, $W_{4,4}$ and $W_{21,21}$ do not need to be read for the above-described reasons, and $W_{1,24}$ is stored in the storage area for storing $W_{jk}$ of the storage unit for the weighting coefficient of the ΔE calculation circuit that uses $W_{1,24}$ at the time of reading $W_{1,1}$ to $W_{1,25}$ for updating the local fields. Therefore, the number of weighting coefficients to be read from the storage unit 21 as $W_{jk}$ is six of $W_{23,6}$, $W_{3,9}$, $W_{25,11}$, $W_{5,14}$, $W_{22,16}$, and $W_{2,19}$. These weighting coefficients can be read in one cycle by the configuration of the address decoder 27 and the storage unit 21 to be described below.

The switch control circuit 23a detects a state variable in the relationship of $x_k$ as illustrated in FIG. 1, for the state variable ($x_j$) with a value of 0 after the state transition, on the basis of the hot bit management table, for example, and detects k other than those omittable among $W_{jk}$ between $x_j$ and $x_k$. In the above example, k=6, 9, 11, 14, 16, and 19 are detected. Therefore, the switch control circuit 23a turns on the switches 21b6, 21b9, 21b11, 21b14, 21b16, and 21b19. The switches 21b6, 21b9, 21b11, 21b14, 21b16, and 21b19 are provided corresponding to the h update circuit 22a6, 22a9, 22a11, 22a14, 22a16, and 22a19. Although not illustrated, other switches are turned off.

Thereby, the above six weighting coefficients are supplied to the propagation control unit 23c.

The propagation of the six weighting coefficients is performed in two cycles using, for example, the five bus units 40a1 to 40am of the propagation control unit 23c.

For example, as illustrated in FIG. 13, $W_{2,19}$ is propagated to the ΔE calculation circuit 24a2 and stored in a storage area 24b2b for storing $W_{jk}$ of the storage unit 24b2. For example, $W_{3,9}$ is propagated to the ΔE calculation circuit 24a3 and stored in a storage area 24b3b for storing $W_{jk}$ of the storage unit 24b3.

(Example of Storage Unit 21 and Address Specification Example)

In the following example, the weighting coefficient ($W_{ij}$(i, j=1 to 25)) included in the weighting coefficient matrix of 25 rows and 25 columns is specified by a global row address, a local row address, a global column address, and a local column address. Each five rows, of the weighting coefficients of twenty-five rows, is specified by each of different global row addresses=1 to 5, and the five rows are respectively specified by local row addresses=1 to 5. Furthermore, each five columns, of the weighting coefficients of twenty-five columns, is specified by each of different global column addresses=1 to 5, and the five columns are respectively specified by local column addresses=1 to 5.

The weighting coefficient to be used for updating the local field is read by specifying one of 1 to 5 as the global row address and the local row address, and specifying all of 1 to 5 as the global column addresses and the local column addresses. Meanwhile, the above-described $W_{jk}$ is read by specifying an address as described below, for example.

FIG. 14 is a diagram illustrating an example of address specification of $W_{jk}$.

For example, $W_{2,19}$ is specified by the global row address=1, the local row address=2, the global column address=4, and the local column address=4. $W_{3,9}$ is specified by the global row address=1, the local row address=3, the global column address=2, and the local column address=4. The other four $W_{jk}$s are also specified by four different addresses.

Figure 15:
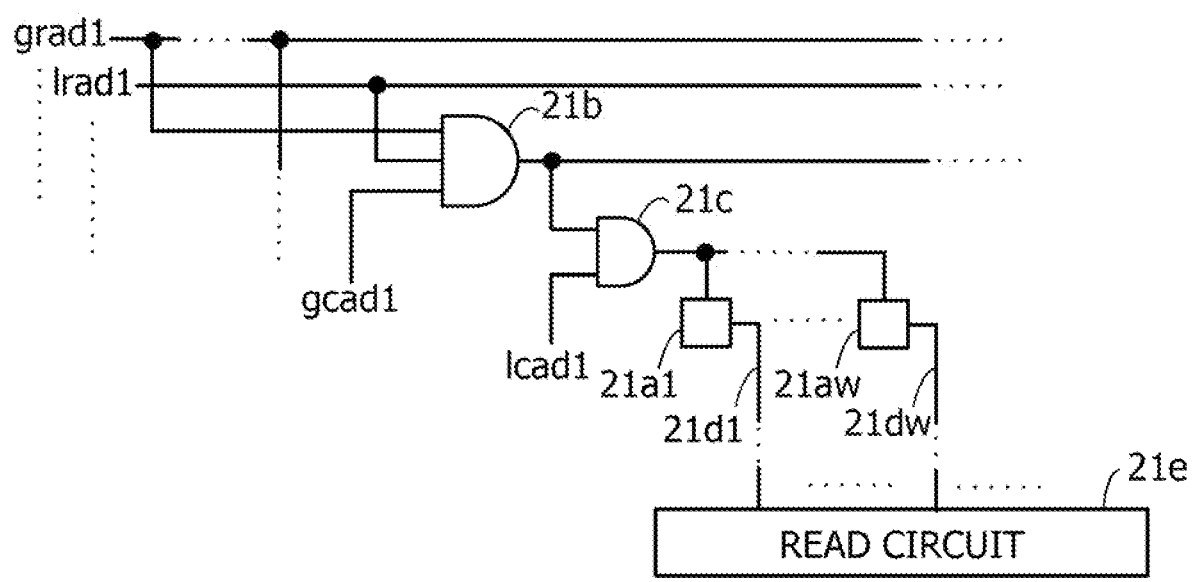
FIG. 15 is a diagram illustrating an example of a storage unit that stores 25×25 weighting coefficients.

FIG. 15 is a diagram illustrating an example of a storage unit that stores 25×25 weighting coefficients.

FIG. 15 illustrates a portion for selecting one w-bit weighting coefficient ($W_{11}$). A signal grad1 is a signal that becomes 1 when the global row address is 1 and becomes 0 in other cases, and a signal lrad1 is a signal that becomes 1 when the local row address is 1 and becomes 0 in other cases. Furthermore, a signal gcad1 is a signal that becomes 1 when the global column address is 1 and becomes 0 in other cases, and a signal lcad1 is a signal that becomes 1 when the local column address is 1 and becomes 0 in other cases.

w-bit $W_{11}$ is stored in memory cells 21a1 to 21aw. The signals grad1, lrad1, and gcad1 are input to a 3-input AND (logical product) circuit 21b.

An output signal of the 3-input AND circuit 21b and the signal lcad1 are input to a 2-input AND circuit 21c, and the memory cells 21a1 to 21aw are selected when an output of the 2-input AND circuit 21c is 1. Then, Wu is read by a read circuit 21e via bit lines 21d1 to 21dw.

Five units each including the memory cells 21a1 to 21aw, the 2-input AND circuit 21c, and the bit lines 21d1 to 21dw as described above are connected to the signal line on which the output signal of the 3-input AND circuit 21b propagates. Moreover, five units each including the above five units and the 3-input AND circuit 21b are connected to the signal line on which the signal Irad1 propagates. Moreover, such a configuration is repeatedly provided for five local row addresses, and the configuration provided for the five local row addresses is further repeatedly provided for five global row addresses.

The signal line for each of the above addresses can be independently set to 1 or 0. Furthermore, in the case where the 2-Way 1-hot constraint is satisfied, different memory cells connected to the same bit line will not be selected at the same time. Therefore, the above six $W_{jk}$s can be selected respectively at the same time and can be read in one cycle.

The address decoder 27 in FIG. 2 generates addresses for specifying the weighting coefficients to be read on the basis of the indexes=p, q, r, s, $g_p$, and $g_s$. In updating the local fields, addresses for specifying all the weighting coefficient of the p, q, r, and s rows are generated. When reading the $W_{jk}$, the address decoder 27 selects a plurality of $W_{jk}$s to be read on the basis of the indexes=p, q, r, s, $g_p$, and $g_s$, and generates addresses for respectively specifying the $W_{jk}$s. For example, after the state transition illustrated in FIG. 5, the index=q, and r=4 and 21. In this case, the address decoder 27 generates addresses for reading the six $W_{23,6}$, $W_{3,9}$, $W_{25,11}$, $W_{5,14}$, $W_{22,16}$, and $W_{2,19}$ as $W_{jk}$s, as described above.

The address decoder 27 may include a memory for storing the hot bit management table as described above. In that case, the address decoder 27 selects a plurality of $W_{jk}$s to be read on the basis of the indexes=p, q, r, s, $g_p$, and $g_s$. The hot bit management table may be the same as that used by the switch control circuit 23a or the like.

The global row address can be expressed as Gr(J)=int((j−1)/size)+1, and the local row address can be expressed as GREL(j)=mod(j−1, size)+1. Furthermore, the global column address can be expressed as Gr(k)=int((k−1)/size)+1 and the local column address can be expressed as GREL(k)=mod (k−1, size)+1.

The size is 5 in the case where each address is set to 1 to 5 as described above.

For example, in a case of reading $W_{23,6}$, Gr(23)=int((23−1)/5)+1=5, GREL(23)=mod(23−1, 5)+1=3, Gr(6))=INT((6−1)/5)+1=2, and GREL(6)=mod(6−1, 5)+1=1. In a case of reading $W_3$,9, Gr(3)=int ((3−1)/5)+1=1, GREL(3)=mod(3−1, 5)+1=3, Gr(9)=Int((9−1)/5)+1=2, and GREL(9)=mod(9−1, 5)+1=4.

As described above, in the storage unit 21 as illustrated in FIG. 15, the signal line for each address can be independently set to 1 or 0, so that the address decoder 27 sets various addresses as described above at the same time.

(Flow of Overall Operation of Optimization Device 20 of Second Embodiment)

Figure 16:
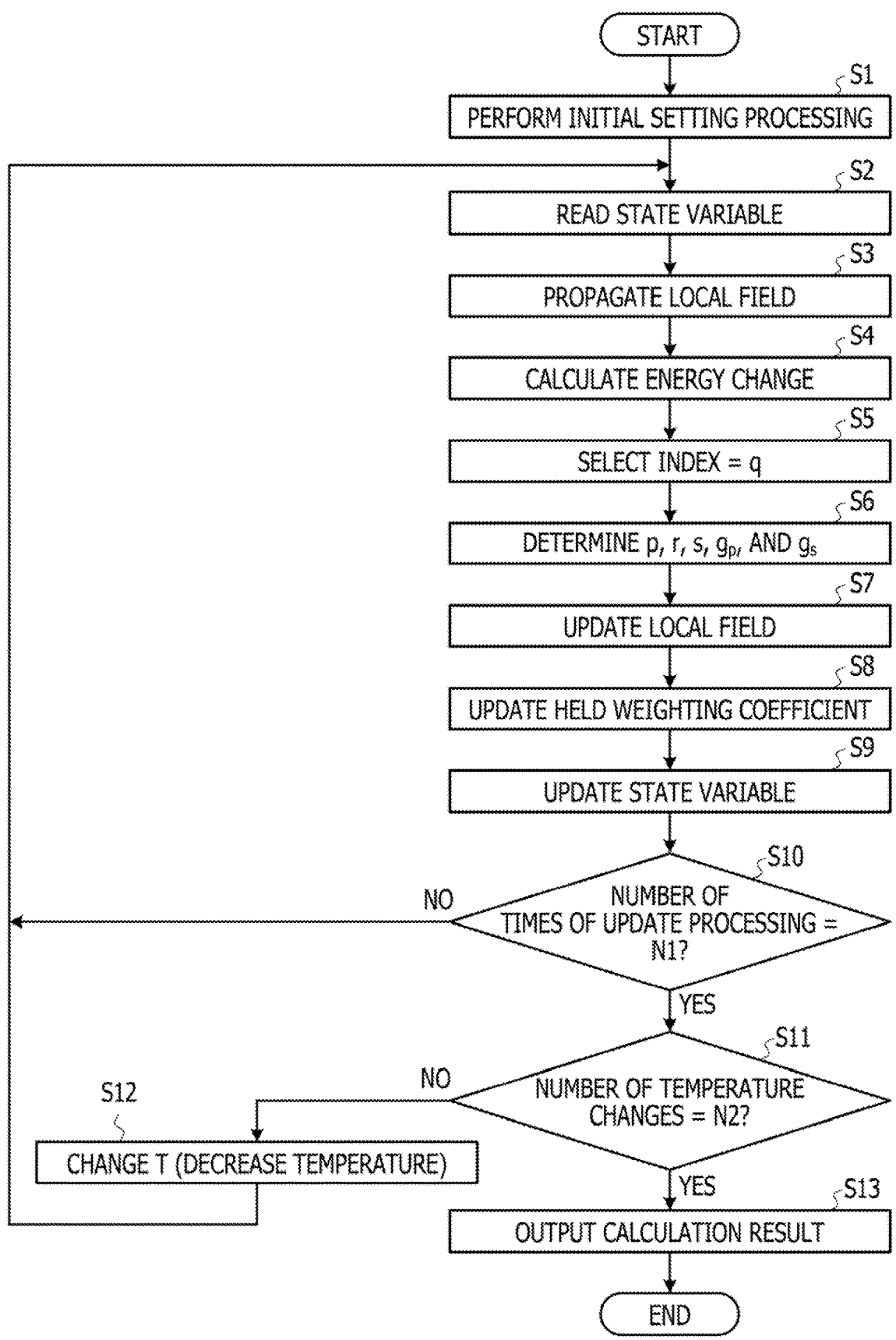
FIG. 16 is a diagram for describing a flow of an example of the optimization device according to the second embodiment.

FIG. 16 is a diagram for describing a flow of an example of the optimization device according to the second embodiment.

Note that, hereinafter, description will be given using a Pseudo-blurring method as an example. However, an embodiment is not limited to the case, and a technique such as a replica exchange method can also be used.

First, the initial setting processing is performed under the control of the control unit 28 (step S1). In the initial setting processing, the control unit 28 stores $W_{11}$ to $W_{nn}$ received from the control device 30 in the storage unit 21. Furthermore, the control unit 28 sets the values of $x_1$ to $x_n$ in the N rows and N columns in the storage unit 26a such that the sum of the values of the state variables included in each row and each column is 1. Moreover, the control unit 28 stores the weighting coefficients corresponding to the initial values of $x_1$ to $x_n$ in the storage units 24b1 to 24bn, for example, and stores the initial values of $h_1$ to $h_n$ corresponding to the initial values of $x_1$ to $x_n$ in resistors (not illustrated) in the h update circuits 22a1 to 22an. Furthermore, the control unit 28 sets the initial value of the temperature parameter (T) based on the temperature change schedule received from the control device 30 and the number of repetitions of the state update processing for the transition selection unit 25. Moreover, the control unit 28 may generate the above-described hot bit management table according to the initial values of $x_1$ to $x_n$ and store the hot bit management table in the memory included in the propagation unit 23 or the like, for example.

After that, the ΔE calculation circuits 24a1 to 24an read the state variables corresponding to themselves from the storage unit 26a (step S2). Then, the propagation unit 23 propagates $h_i$, $h_j$, $h_k$, and $h_l$ in the respective ΔE calculation circuits 24a1 to 24an from the h update circuits 22a1 to 22an to the ΔE calculation circuits 24a1 to 24an (step S3). At the first time, the propagation unit 23 determines propagation routes of $h_i$, $h_j$, $h_k$, and $h_l$ on the basis of, for example, the hot bit management table. Then, from the second time onward, the propagation unit 23 determines the propagation routes on the basis of the indexes=p, q, r, s, $g_p$, and $g_s$ or the hot bit management table updated with these indexes.

Next, the ΔE calculation circuits 24a1 to 24an calculate the energy change (step S4). Among the ΔE calculation circuits 24a1 to 24an, those corresponding to the state variables with a value of 0 calculate $ΔE_j$ as illustrated in the equation (3). Among the ΔE calculation circuits 24a1 to 24an, those corresponding to the state variable with a value of 1 output a predetermined positive value as the energy change.

Then, the transition selection unit 25 selects the index=q on the basis of the energy changes calculated by the ΔE calculation circuits 24a1 to 24an (step S5).

For example, the transition selection unit 25 compares a noise value generated on the basis of the temperature parameter (T) and a uniform random number with each of the plurality of energy changes, selects the energy change smaller than the noise value, and selects the index of the energy change as q. In a case where there is a plurality of energy changes smaller than the noise value, the transition selection unit 25 selects one of the energy changes according to a predetermined rule or at random, for example. In a case where there is no energy change smaller than the noise value, the transition selection unit 25 may facilitate occurrence of a state transition by adding an offset value to the noise value or the like.

The transition selection unit 25 further determines the indexes=p, r, s, $g_p$, and $g_s$, from the selected index=q (step S6).

Thereafter, the local field update unit 22 updates the local field (step S7). In the processing in step S7, the weighting coefficients to be used for updating the local field are read from the storage unit 21 on the basis of the indexes=p, r, s, $g_p$, and $g_s$, and the local fields are updated on the basis of the equation (4) on the basis of the weighting coefficients. Note that, in the processing in step S7, the weighting coefficient corresponding to $W_{il}$ of the read weighting coefficients is stored in any of the storage units 24b1 to 25bn.

Furthermore, the weighting coefficients stored in the storage units 24b1 to 24bn of the ΔE calculation circuits 24a1 to 24an are updated (step S8). In the processing in step S8, the weighting coefficients stored in the storage units 24b1 to 24bn are read from the storage unit 21 on the basis of the indexes=p, r, s, $g_p$, and $g_s$. Then, the read weighting coefficient is propagated by the propagation unit 23 to the ΔE calculation circuit using the weighting coefficient, and the weighting coefficient stored in the storage unit of the ΔE calculation circuit is updated with the newly read weighting coefficient.

Moreover, the update unit 26 updates the four state variables stored in the storage unit 26a on the basis of the indexes=p, r, s, $g_p$, and $g_s$ (step S9).

The control unit 28 determines whether the number of times of the state update processing in above steps S2 to S9 has reached a predetermined number of times N1 (step S10). In a case where the number of times of the state update processing has not reached the predetermined number of times N1, the processing from step S2 is repeated.

In a case where the number of times of the state update processing has reached the predetermined number of times N1, the control unit 28 determines whether the number of changes in T (the number of changes in temperature) has reached a predetermined number of times N2 (step S11).

In a case where the number of changes in temperature has not reached the predetermined number of times N2, the control unit 28 changes T (decreases the temperature)(step S12). The manner of changing the values of the predetermined numbers of times N1 and N2, and T (how much the values are reduced at once, or the like) is determined on the basis of a predetermined temperature change schedule and the like. After the processing in step S12, the processing from step S2 is repeated.

When the number of changes in temperature has reached the predetermined number of times N2, the control unit 28 outputs values of all the state variables stored in the storage unit 26a at that time to the control device 30 as calculation results (step S13), for example, and terminates the processing. Note that the control unit 28 may calculate the energy on the basis of values of all the state variables every time the state transition occurs, sequentially update the values of all the state variables in which the minimum energy is obtained, and output the values of all the state variables at the time when the number of changes in temperature has reached the predetermined number of times N2 as a solution.

Note that the order of the above processing is not limited to the above example, and the order may be appropriately changed.

According to the optimization device 20 of the second embodiment as described above, effects similar to those of the optimization device 10 of the first embodiment may be obtained. That is, the calculation time for the optimization problem having the 2-Way 1-hot constraint can be shortened, and the hardware for storing the weighting coefficients can be reduced.

Moreover, the above-described efficient techniques of reading $W_{il}$ and $W_{jk}$ can reduce the number of accesses to the storage unit 21, and a further decrease in the calculation time can be expected.

Figure 17:
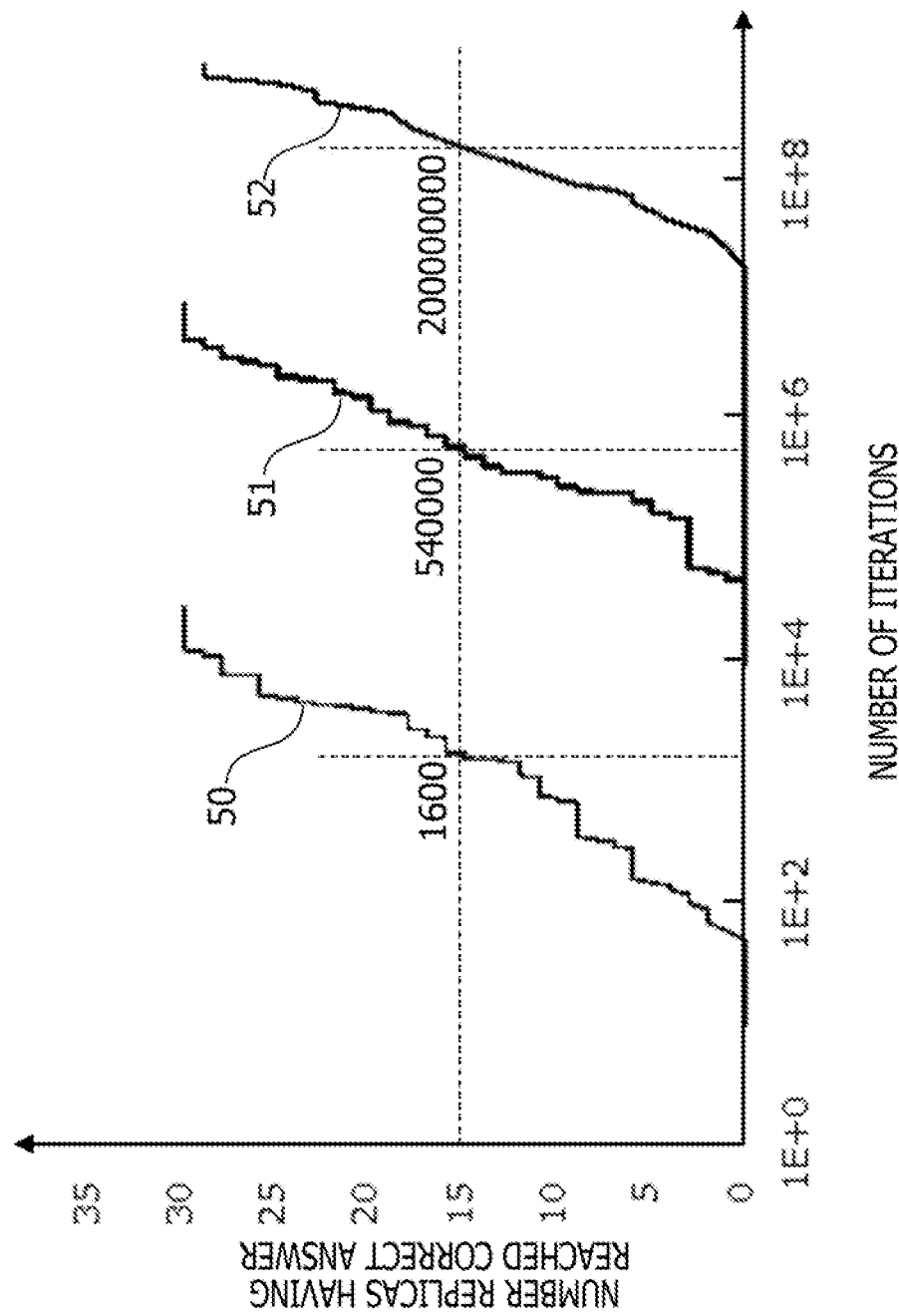
FIG. 17 is a diagram illustrating a simulation result illustrating a calculation shortening effect in a case where the optimization device of the second embodiment is used.

FIG. 17 is a diagram illustrating a simulation result illustrating the calculation shortening effect in the case of using the optimization device of the second embodiment.

A combinatorial optimization problem to be calculated is "2QAP 1K had 12", which is one of secondary allocation problems and the correct answer is known. The horizontal axis represents the number of iterations (the number of times of update processing as described above), and the vertical axis represents the number of replicas that have reached the correct answer (the number of optimization devices 20).

FIG. 17 illustrates a result 50 in the case of using the 4-bit transition optimization device 20 as described above, and a result 51 in a case of using a 2-bit transition optimization device that performs a search, excluding states other than the state satisfying the 1-hot constraint in one direction of a column or a row. Moreover, a result 52 in a case of using a conventional 1-bit transition optimization device is illustrated.

As illustrated in FIG. 17, the optimization device 20 can reduce the number of iterations to reach the correct answer to 1/100 or less, as compared with the 2-bit transition optimization device. For example, in a case of the number of replicas that reached the correct answer=15, the number of iterations is reduced to 1/337, which shows that the calculation is faster.

Third Embodiment

The optimization device 20 of the second embodiment is provided with the ΔE calculation circuits 24a1 to 24an by the same number as the number of state variables ($n=N^2$). However, the number of ΔE calculation circuits may be smaller than $N^2$. Hereinafter, an example of an optimization device in which the number of ΔE calculation circuits is smaller than $N^2$ will be described.

Figure 18:
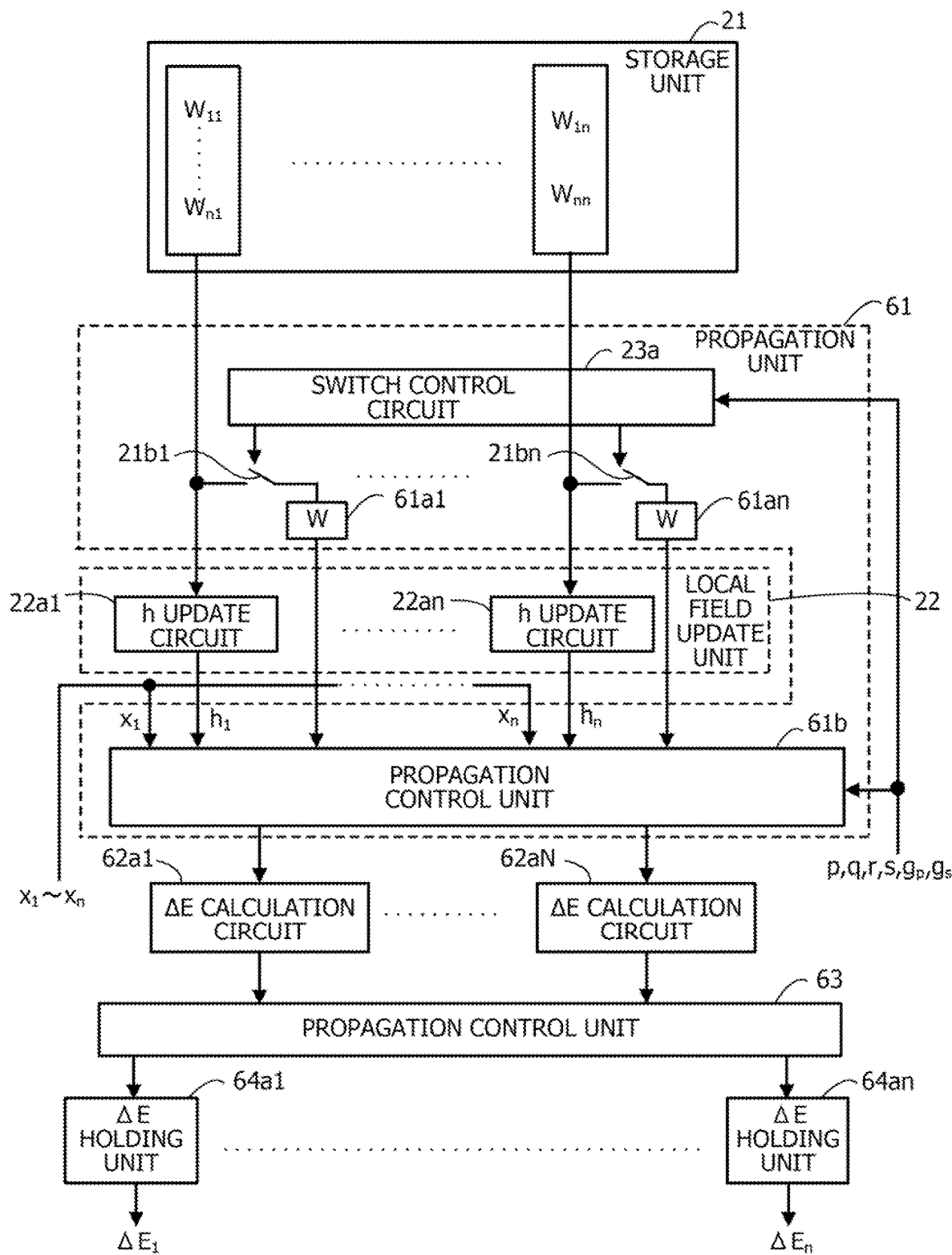
FIG. 18 is a diagram illustrating an example of an optimization device of a third embodiment.

FIG. 18 is a diagram illustrating an example of an optimization device of a third embodiment. In FIG. 18, the same elements as those illustrated in FIG. 3 are denoted by the same reference numerals, and illustration is omitted.

In an optimization device 60 of the third embodiment, a propagation unit 61 is different from the propagation unit 23 in FIG. 3, and the number of ΔE calculation circuits 62a1 to 62aN is N. Furthermore, the optimization device 60 includes a propagation control unit 63 and n ($=N^2$) ΔE holding units 64a1 to 64an.

In the optimization device 20 of the second embodiment in which the number of ΔE calculation circuits is equal to $N^2$, $W_{il}$ and $W_{jk}$ are stored in the storage units 24b1 to 24bn of the ΔE calculation circuits 24a1 to 24an. In contrast, in the optimization device 60 of the third embodiment in which the number of ΔE calculation circuits is smaller than $N^2$, $W_{il}$ and $W_{jk}$ are stored correspond to each of $N^2$ h update circuits 22a1 to 22an. For example, in a case of j=1 in the equation (3), $W_{il}$ and $W_{jk}$ (for example, $W_{4,21}$ and $W_{1,24}$ in FIG. 6 in a case of after the state transition in FIG. 5) to be used for calculating $\Delta E_1$ is stored in association with the h update circuit $22ai$ that updates $h_1$.

However, to simplify a circuit configuration, hereinafter, $W_{il}$ and $W_{jk}$ is stored corresponding to each h update circuit that updates a local field represented by the indexes=l and k. For example, after the state transition as illustrated in FIG. 5, $W_{4,21}$ that is $W_{il}$ to be used for calculating $\Delta E_1$ is stored corresponding to the h update circuit that updates $h_{21}$, and $W_{1,24}$ that is $W_{jk}$ to be used for calculating $\Delta E_1$ is stored corresponding to the h update circuit that updates $h_{24}$.

In the optimization device 60, the propagation unit 61 includes storage units 61a1 to 61an provided corresponding to the h update circuits 22a1 to 22an, respectively. Each of the storage units 61a1 to 61an stores a weighting coefficient read from a storage unit 21 when a corresponding switch of switches 21b1 to 21bn is turned on. For example, when the switch 21b1 is turned on, any of $W_{11}$ to $W_{n1}$ read from the storage unit 21 is stored in the storage unit 61a1. When the switch 21bn is turned on, any of $W_{1n}$ to $W_{nn}$ read from the storage unit 21 is stored in the storage unit 61an. The storage units 61a1 to 61an can be implemented by, for example, an electronic circuit such as a register or SRAM.

Furthermore, a propagation control unit 61b is different from the propagation control unit 23c of the optimization device 20 of the first embodiment.

The propagation control unit 61b functions as an $N^2$:N multiplexer that distributes n local fields (or weighting coefficients or state variables corresponding thereto) to N ΔE calculation circuits 62a1 to 62aN. The $N^2$:N multiplexer is implemented by a plurality of N:1 multiplexers.

Meanwhile, the propagation control unit 63 functions as N:$N^2$ demultiplexer that distributes the energy changes calculated by the N ΔE calculation circuits 62a1 to 62aN to N of n ΔE holding units 64a1 to 64an. The N $N^2$ demultiplexer is implemented by a plurality of 1:N demultiplexers.

Hereinafter, the case of N=5 will be described as an example.

Figure 19:
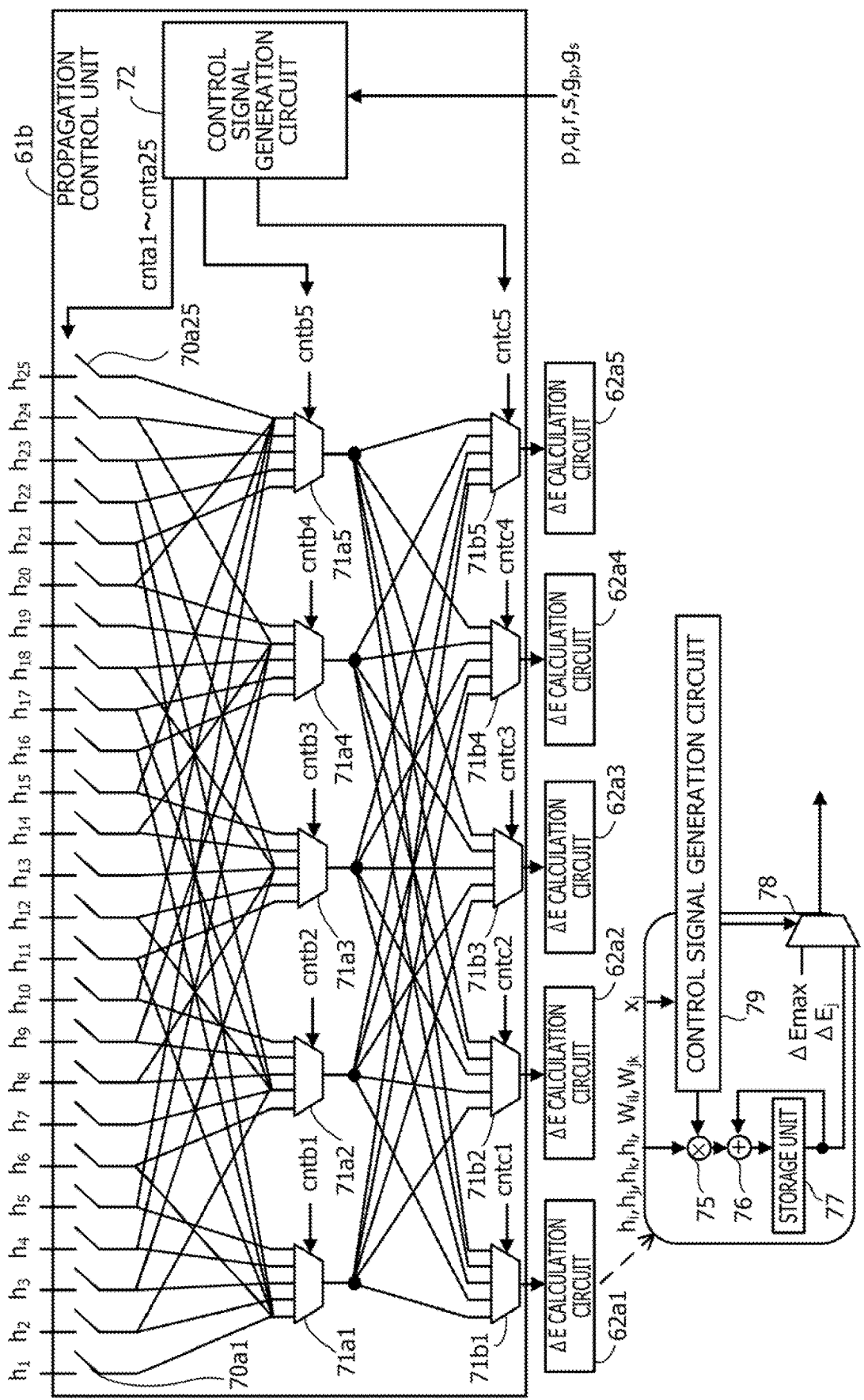
FIG. 19 is a diagram illustrating an example of a propagation control unit that propagates a local field and a weighting coefficient.

FIG. 19 is a diagram illustrating an example of a propagation control unit that propagates a local field and a weighting coefficient.

The propagation control unit 61b includes twenty-five switches 70a1 to 70a25, multiplexers 71a1, 71a2, 71a3, 71a4, 71a5, 71b1, 71b2, 71b3, 71b4, and 71b5, and a control signal generation circuit 72.

Each end of the switches 70a1 to 70a25 receives one of $h_1$ to $h_{25}$ as an input, and the other end is connected to one of five input terminals of any two of the multiplexers 71a1 to 71a5 except for the switches 70a1 and 70a25. The other end of the switch 70a1 is connected to one of the five input terminals of the multiplexer 71a1, and the other end of the switch 70a25 is connected to one of the five input terminals of the multiplexer 71a5. Note that in a case where the weighting coefficients are stored in the storage units 61a1 to 61an, the weighting coefficients are also input to respective one ends of the switches 70a1 to 70a25 corresponding to $h_1$ to $h_{25}$. The switches 70a1 to 70a25 are turned on and off by control signals cnta1 to cnta25 generated by the control signal generation circuit 72.

Each of the multiplexers 71a1 to 71a5 selects and outputs one of local fields (or weighting coefficients) input to the five input terminals according to any of control signals cntb1, cntb2, cntb3, cntb4, and cntb5 output by the control signal generation circuit 72.

The local fields (or weighting coefficients) output by the multiplexers 71a1 to 71a5 are respectively input to the five input terminals of the multiplexers 71b1 to 71b5. Each of the multiplexers 71b1 to 71b5 selects and outputs one of local fields (or weighting coefficients) input to the five input terminals according to any of control signals cntc1, cntc2, cntc3, cntc4, and cntc5 output by the control signal generation circuit 72.

The control signal generation circuit 72 generates and outputs control signals cnta1 to cnta25, cntb1 to cntb5, and cntc1 to cntc5 on the basis of the index=p, q, r, s, $g_p$, or $g_s$. The control signal generation circuit 72 may include, for example, a memory for storing the hot bit management table as described above. In that case, the control signal generation circuit 72 generates each of the above-described control signals on the basis of the hot bit management table. The hot bit management table is updated on the basis of the indexes=p, q, r, s, $g_p$, and $g_s$.

Note that $x_1$ to $x_n$ input to the propagation control unit 61b are propagated together with $h_j$ in a cycle of propagating $h_j$ in the equation (3), for example.

In the case of N=5, five $\Delta E$ calculation circuits 62a1, 62a2, 62a3, 62a4, and 62a5 are provided, as illustrated in FIG. 19.

The local field (or weighting coefficient or state variable) is supplied to the $\Delta E$ calculation circuit 62a1 from the multiplexer 71b1, to the $\Delta E$ calculation circuit 62a2 from the multiplexer 71b2, and to the $\Delta E$ calculation circuit 62a3 from the multiplexer 71b3, respectively. Furthermore, the local field (or weighting coefficient) is supplied to the $\Delta E$ calculation circuit 62a4 from the multiplexer 71b4 and to the $\Delta E$ calculation circuit 62a5 from the multiplexer 71b5, respectively.

Note that FIG. 19 illustrates a circuit configuration of an example of the $\Delta E$ calculation circuit 62a1. The $\Delta E$ calculation circuits 62a2 to 62a5 have a similar circuit configuration.

The $\Delta E$ calculation circuit 62a1 includes a multiplier 75, an adder 76, a storage unit 77, a selector 78, and a control signal generation circuit 79.

The multiplier 75 multiplies $h_i$, $h_j$, $h_k$, $h_l$, $W_{il}$, and $W_{jk}$ output by the multiplexer 71b1 by a code (+1 or −1) output by the control signal generation circuit 79.

The adder 76 outputs an addition result of a multiplication result output by the multiplier 75 and a value stored in the storage unit 77.

The storage unit 77 stores the addition result output by the adder 76. The storage unit 77 can be implemented by, for example, an electronic circuit such as a register or SRAM.

The selector 78 selects and outputs either a predetermined positive value ($\Delta E_{max}$) stored in a register (not illustrated) or the like, or an energy change ($\Delta E_j$) stored in the storage unit 77, for example, on the basis of a selection signal output by the control signal generation circuit 79.

The control signal generation circuit 79 generates a code to be multiplied with $h_i$, $h_j$, $h_k$, $h_l$, $W_{il}$, and $W_{jk}$ for each cycle in which the propagation control unit 61b propagates $h_i$ or the like. Moreover, the control signal generation circuit 79 outputs the selection signal for selecting $\Delta E_{max}$ to the selector 78 in a case where $x_j$ output by the multiplexer 71b1 is 1, and outputs the selection signal for selecting $\Delta E_j$ to the selector 78 in a case where $x_j$ is 0.

Note that the $\Delta E$ calculation circuits 24a1 to 24an in FIG. 2 can also be implemented by nearly a similar circuit configuration to the above description.

The configuration using the five multiplexers 71a1 to 71a5 as in FIG. 19 corresponds to using five buses. It takes 4N cycles to calculate $N^2$ energy changes using N buses and N $\Delta E$ calculation circuits. In the case of N=5, it takes 20 cycles.

FIG. 20 is a diagram illustrating an example of the energy change calculated in each cycle in the case of N=5.

In cycles 1 to 4, $\Delta E_j$ of j=1 to 5 is calculated. In cycle 1, $h_i$ is propagated by the propagation control unit 61b, and the control signal generation circuit 79 outputs +1 as a code. As a result, $\Delta E_j$ stored in the storage unit 77 is $h_i$. In cycle 2, $h_j$ and $x_j$ are propagated by the propagation control unit 61b, and the control signal generation circuit 79 outputs −1 as a code. As a result, $\Delta E_j -= h_j$ is calculated, and $\Delta E_j$ stored in the storage unit 77 is $h_i - h_j$. In cycle 3, $h_k$ and $W_{jk}$ are propagated by the propagation control unit 61b, and the control signal generation circuit 79 outputs −1 as a code. As a result, $\Delta E_j -= h_k + W_{jk}$ is calculated, and $\Delta E_j$ stored in the storage unit 77 is $h_i - h_j - h_k - W_{jk}$. In cycle 4, $h_l$ and $W_{il}$ are propagated by the propagation control unit 61b, and the control signal generation circuit 79 outputs +1 for $h_l$ and −1 for $W_{il}$ as codes. As a result, $\Delta E_j += h_l - W_{il}$ is calculated, and $\Delta E_j$ stored in the storage unit 77 is $h_i - h_j - h_k + h_l - W_{jk} - W_{il}$, that is, $\Delta E_j$ expressed by the equation (3). Note that the $\Delta E$ calculation circuit that calculates $\Delta E_j$ corresponding to $x_j$ with a value of 1 outputs $\Delta E_{max}$ instead of $\Delta E_j$.

In cycles 5 to 8, the same processing is performed for j=6 to 10, and in cycles 9 to 12, the same processing is performed for j=11 to 15. Furthermore, in cycles 13 to 16, the same processing is performed for j=16 to 20, and in cycles 17 to 20, the same processing is performed for j=21 to 25.

Next, an operation example of the propagation control unit 61b in each of the above-described cycles after the state transition as illustrated in FIG. 5 will be described.

Figure 21:
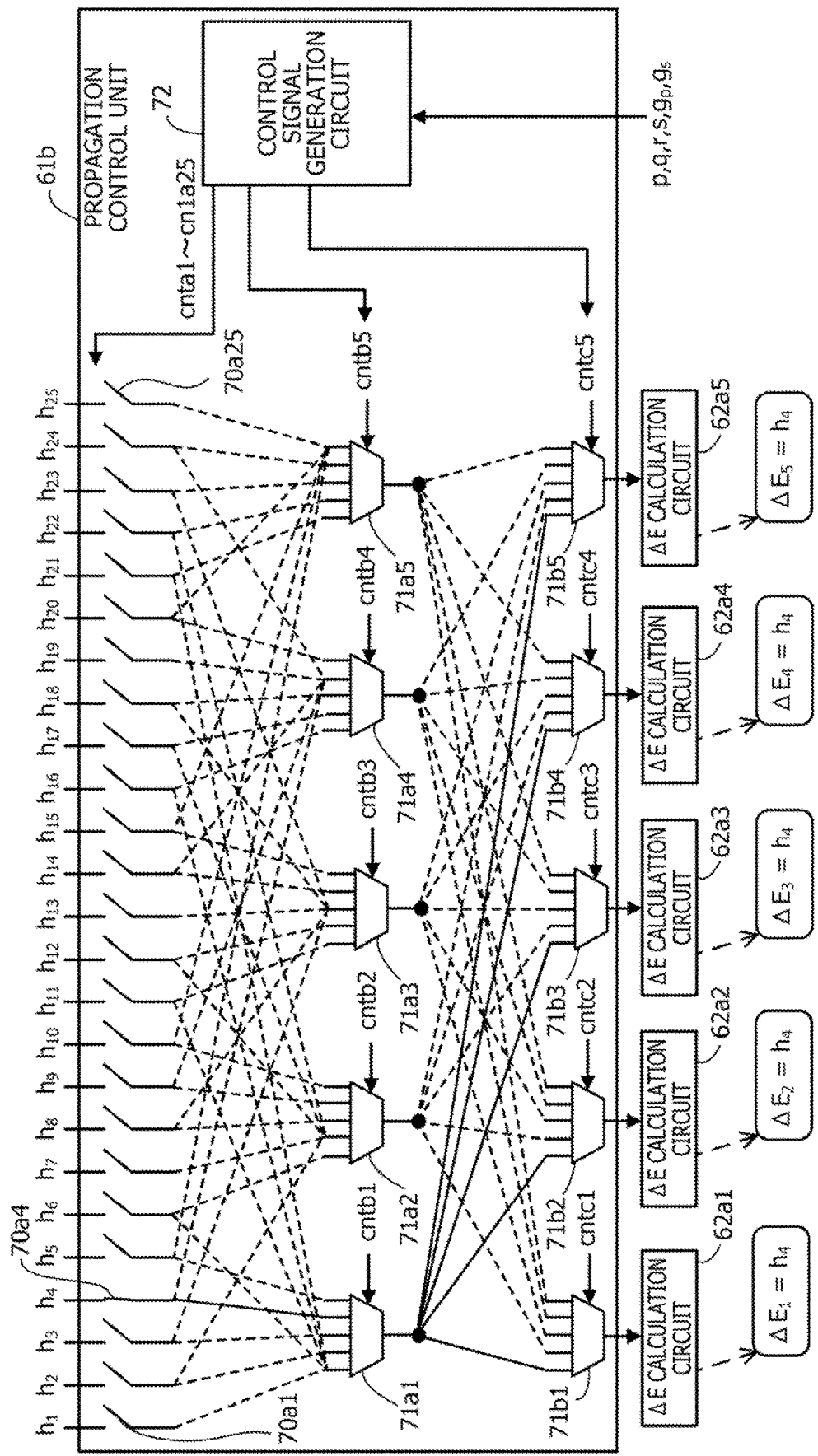
FIG. 21 is a diagram illustrating an operation example of the propagation control unit in cycle 1.

FIG. 21 is a diagram illustrating an operation example of the propagation control unit in cycle 1. Note that, in FIG. 21, signal lines that are not valid as those through which $h_i$ propagates are illustrated by the dotted lines.

After the state transition illustrated in FIG. 5, $x_4$ out of $x_1$ to $x_5$ becomes 1. Therefore, $h_4$ as $h_i$ is propagated to the $\Delta E$ calculation circuits 62a1 to 62a5. In this case, the switch 70a4, of the switches 70a1 to 70a25, is turned on and the other switches are turned off. Then, the multiplexer 71a1 selects and outputs the input $h_4$, and the multiplexers 71b1 to 71b5 select and output $h_4$ that is the output of the multiplexer 71a1. Thereby, $\Delta E_1$ to $\Delta E_5$ calculated by the $\Delta E$ calculation circuits 62a1 to 62a5 in cycle 1 become $h_4$.

Figure 22:
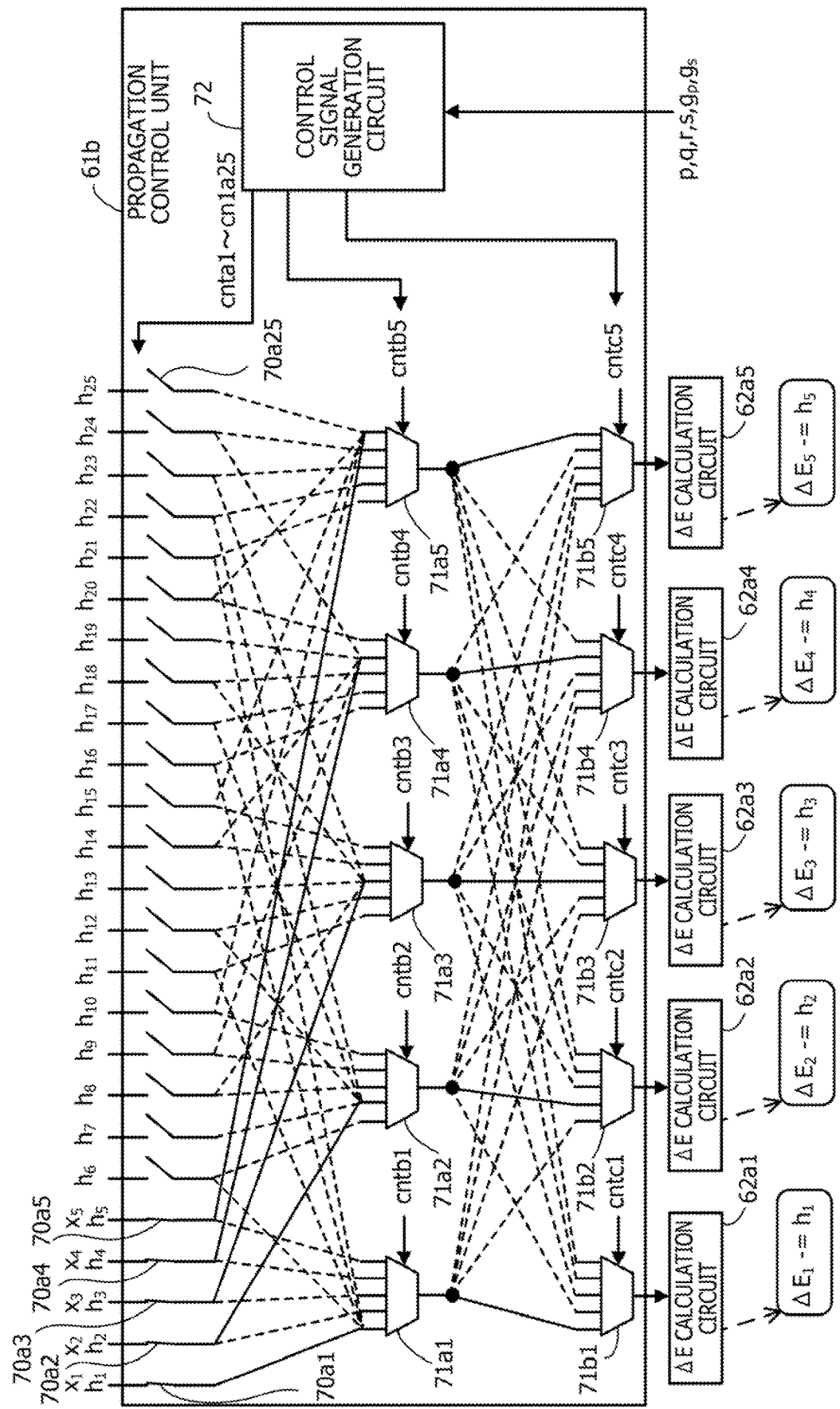
FIG. 22 is a diagram illustrating an operation example of the propagation control unit in cycle 2.

FIG. 22 is a diagram illustrating an operation example of the propagation control unit in cycle 2. Note that, in FIG. 22, signal lines that are not valid as those through which $h_j$ and $x_j$ propagate are illustrated by the dotted lines.

In cycle 2, $h_1$ to $h_5$ and $x_1$ to $x_5$ are propagated. In this case, the switches 70a1 to 70a5, of the switches 70a1 to 70a25, are turned on and the other switches are turned off. Then, the multiplexer 71a1 selects and outputs the input $h_1$ and $x_1$, the multiplexer 71a2 selects and outputs the input $h_2$ and $x_2$, and the multiplexer 71a3 selects and outputs the input $h_3$ and $x_3$. Furthermore, the multiplexer 71a4 selects and outputs the input $h_4$ and $x_4$, and the multiplexer 71a5 selects and outputs the input $h_5$ and $x_5$.

Furthermore, the multiplexer 71b1 selects and outputs $h_1$ and $x_1$ that are the outputs of the multiplexer 71a1, and the multiplexer 71b2 selects and outputs $h_2$ and $x_2$ that are the outputs of the multiplexer 71a2. The multiplexer 71b3 selects and outputs $h_3$ and $x_3$ that are the outputs of the multiplexer 71a3, and the multiplexer 71b4 selects and outputs $h_4$ and $x_4$ that are the outputs of the multiplexer 71a4. The multiplexer 71b5 selects and outputs $h_5$ and $x_5$ that are the outputs of the multiplexer 71a5.

Thereby, the $\Delta E$ calculation circuit 62a1 calculates $\Delta E_1 -= h_1$, the $\Delta E$ calculation circuit 62a2 calculates $\Delta E_2 -= h_2$, the $\Delta E$ calculation circuit 62a3 calculates $\Delta E_3 -= h_3$, and the $\Delta E$ calculation circuit 62a4 calculates $\Delta E_4 -= h_4$, and the $\Delta E$ calculation circuit 62a5 calculates $\Delta E_5 -= h_5$.

Figure 23:
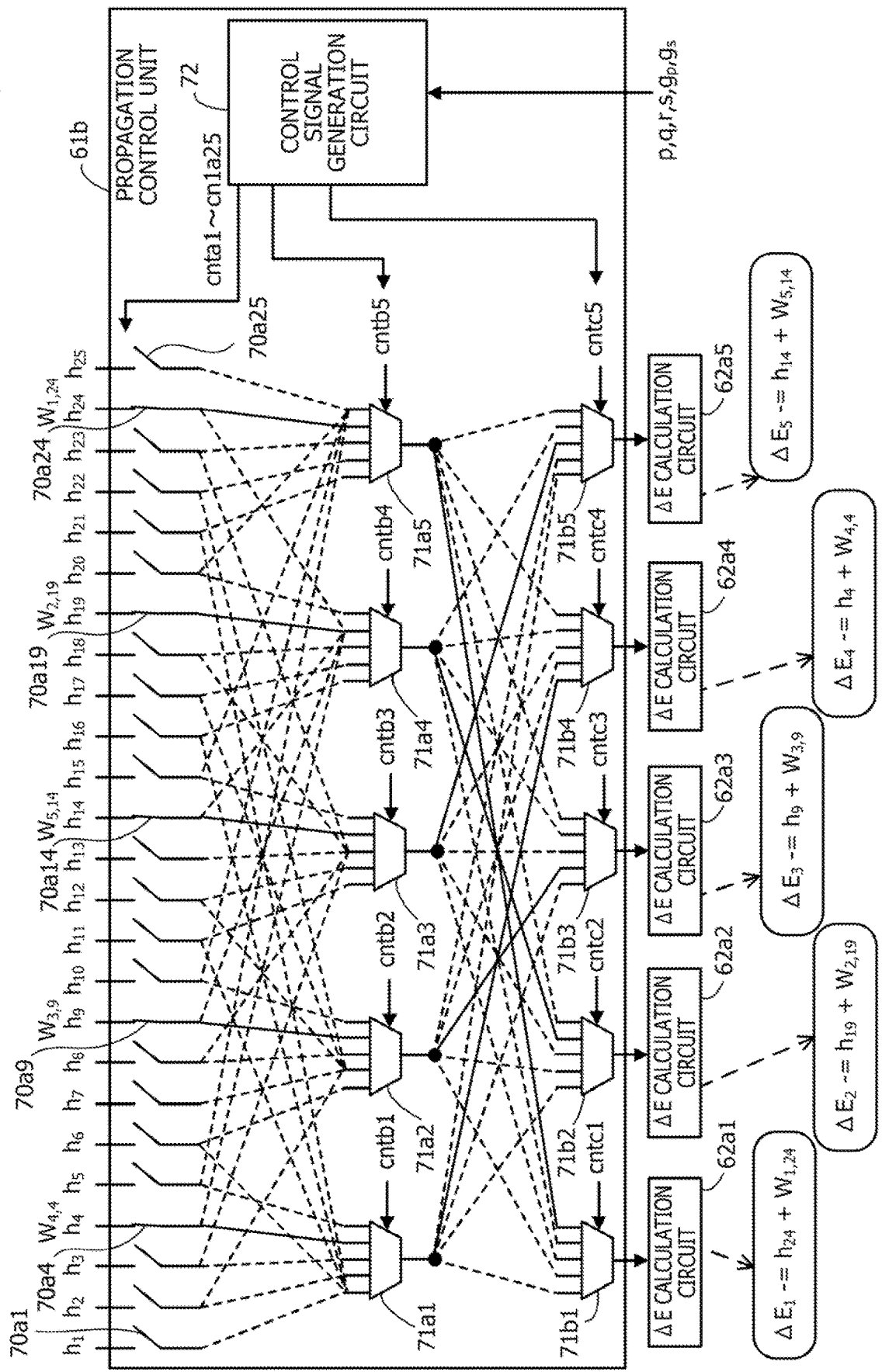
FIG. 23 is a diagram illustrating an operation example of the propagation control unit in cycle 3.

FIG. 23 is a diagram illustrating an operation example of the propagation control unit in cycle 3. Note that, in FIG. 23, signal lines that are not valid as those through which $h_k$ and $W_{jk}$ propagate are illustrated by the dotted lines.

In cycle 3, $h_4$, $h_9$, $h_{14}$, $h_{19}$, and $h_{24}$ as $h_k$, and $W_{4,4}$, $W_{3,9}$, $W_{5,14}$, $W_{2,19}$, and $W_{1,24}$ as $W_{jk}$ are propagated. These weighting coefficients are read from the storage unit 21 by the address decoder 27 after the state transition illustrated in FIG. 5, and are stored in the storage units corresponding to the h update circuits that update $h_4$, $h_9$, $h_{14}$, $h_{19}$, and $h_{24}$, of the storage units 61a1 to 61an.

In this case, the switches 70a4, 70a9, 70a14, 70a19, and 70a24, of the switches 70a1 to 70a25, are turned on, and the other switches are turned off. Then, the multiplexer 71a1 selects and outputs the input $h_4$ and $W_{4,4}$, the multiplexer 71a2 selects and outputs the input $h_9$ and $W_{3,9}$, and the multiplexer 71a3 selects and outputs the input $h_{14}$ and $W_{5,14}$. Furthermore, the multiplexer 71a4 selects and outputs the input $h_{19}$ and $W_{2,19}$, and the multiplexer 71a5 selects and outputs the input $h_{24}$ and $W_{1,24}$.

Furthermore, the multiplexer 71b1 selects and outputs $h_{24}$ and $W_{1,24}$ that are the outputs of the multiplexer 71a5, and the multiplexer 71b2 selects and outputs $h_{19}$ and $W_{2,19}$ that are the outputs of the multiplexer 71a4. The multiplexer 71b3 selects and outputs $h_9$ and $W_{3,9}$ that are the outputs of the multiplexer 71a2, and the multiplexer 71b4 selects and outputs $h_4$ and $W_{4,4}$ that are the outputs of the multiplexer 71a1. The multiplexer 71b5 selects and outputs $h_{14}$ and $W_{5,14}$ that are the outputs of the multiplexer 71a3.

Thereby, the ΔE calculation circuit 62a1 calculates $\Delta E_1 -= h_{24} + W_{1,24}$, the ΔE calculation circuit 62a2 calculates $\Delta E_2 -= h_{19} + W_{2,19}$, and the ΔE calculation circuit 62a3 calculates $\Delta E_3 -= h_4 + W_{3,9}$. Furthermore, the ΔE calculation circuit 62a4 calculates $\Delta E_4 -= h_4 + W_{4,4}$, and the ΔE calculation circuit 62a5 calculates $\Delta E_5 -= h_{14} + W_{5,14}$.

Figure 24:
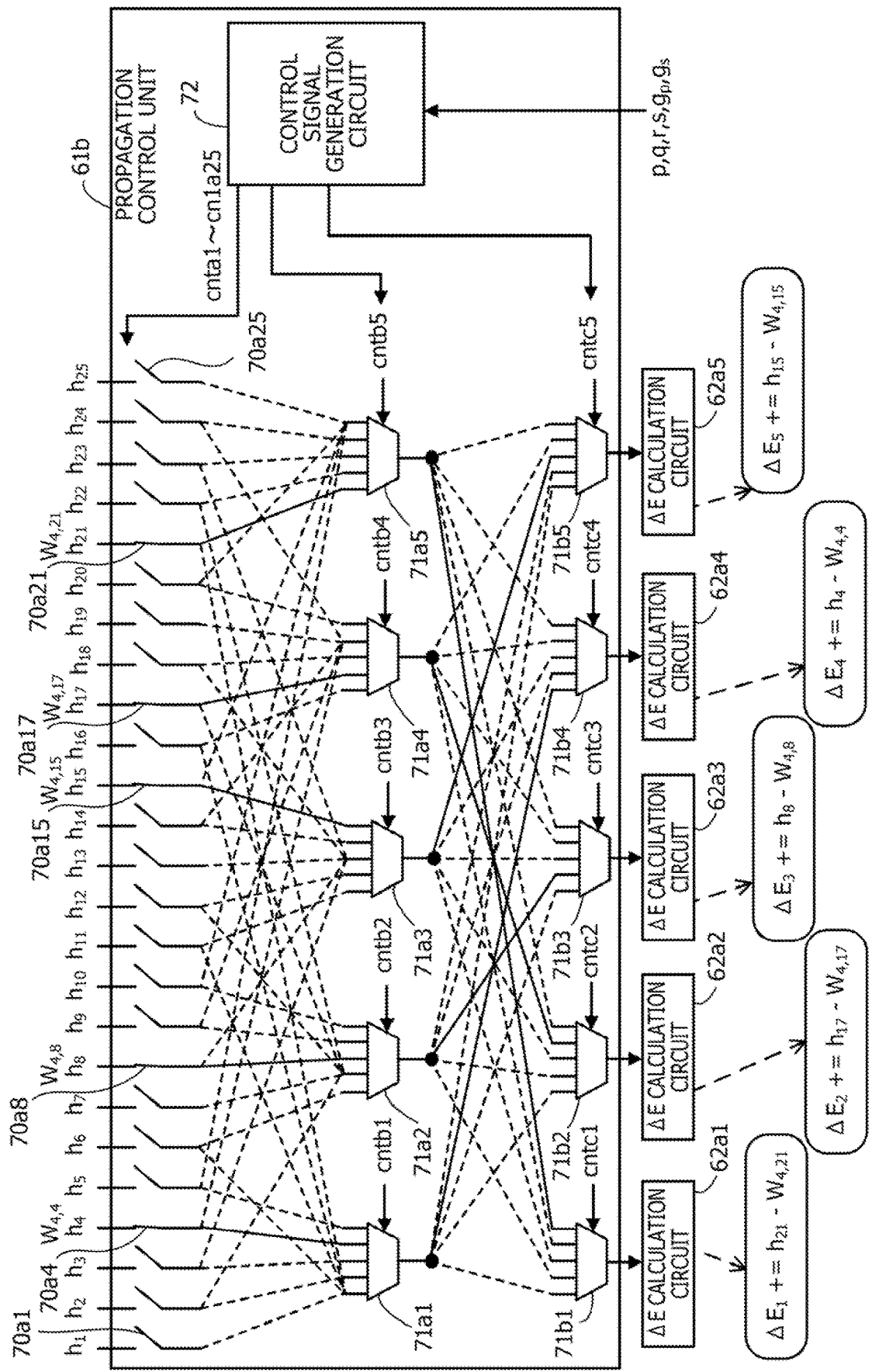
FIG. 24 is a diagram illustrating an operation example of the propagation control unit in cycle 4.

FIG. 24 is a diagram illustrating an operation example of the propagation control unit in cycle 4. Note that, in FIG. 24, signal lines that are not valid as those through which $h_l$ and $W_{il}$ propagate are illustrated by the dotted lines.

In cycle 4, $h_4$, $h_8$, $h_{15}$, $h_{17}$, and $h_{21}$ as $h_l$, and $W_{4,4}$, $W_{4,8}$, $W_{4,15}$, $W_{4,17}$, and $W_{4,21}$ as $W_{il}$ are propagated. These weighting coefficients are read from the storage unit 21 by the address decoder 27 after the state transition illustrated in FIG. 5, and are stored in the storage units corresponding to the h update circuits that update $h_4$, $h_8$, $h_{15}$, $h_{17}$, and $h_{21}$, of the storage units 61a1 to 61an.

In this case, the switches 70a4, 70a8, 70a15, 70a17, and 70a21, of the switches 70a1 to 70a25, are turned on, and the other switches are turned off. Then, the multiplexer 71a1 selects and outputs the input $h_4$ and $W_{4,4}$, the multiplexer 71a2 selects and outputs the input $h_8$ and $W_{4,8}$, and the multiplexer 71a3 selects and outputs the input $h_{15}$ and $W_{4,15}$. Furthermore, the multiplexer 71a4 selects and outputs the input $h_{17}$ and $W_{4,17}$, and the multiplexer 71a5 selects and outputs the input $h_{21}$ and $W_{4,21}$.

Furthermore, the multiplexer 71b1 selects and outputs $h_{21}$ and $W_{4,21}$ that are the outputs of the multiplexer 71a5, and the multiplexer 71b2 selects and outputs $h_{17}$ and $W_{4,17}$ that are the outputs of the multiplexer 71a4. The multiplexer 71b3 selects and outputs $h_8$ and $W_{4,8}$ that are the outputs of the multiplexer 71a2, and the multiplexer 71b4 selects and outputs $h_4$ and $W_{4,4}$ that are the outputs of the multiplexer 71a1. The multiplexer 71b5 selects and outputs $h_{15}$ and $W_{4,15}$ that are the outputs of the multiplexer 71a3.

Thereby, the ΔE calculation circuit 62a1 calculates $\Delta E_1 += h_{21} - W_{4,21}$, the ΔE calculation circuit 62a2 calculates $\Delta E_2 += h_{17} - W_{4,17}$, and the ΔE calculation circuit 62a3 calculates $\Delta E_3 += h_4 - W_{4,4}$. Furthermore, the ΔE calculation circuit 62a4 calculates $\Delta E_4 += h_4 - W_{4,4}$, and the ΔE calculation circuit 62a5 calculates $\Delta E_5 += h_{15} - W_{4,15}$.

The calculation of the equation (3) for $\Delta E_1$ to $\Delta E_5$ is completed in the above cycles 1 to 4. Note that, since $x_4 = 1$, ΔEmax is output as $\Delta E_4$ instead of the value calculated as described above.

In the subsequent cycles, $\Delta E_6$ to $\Delta E_{25}$ are calculated by similar control.

Figure 25:
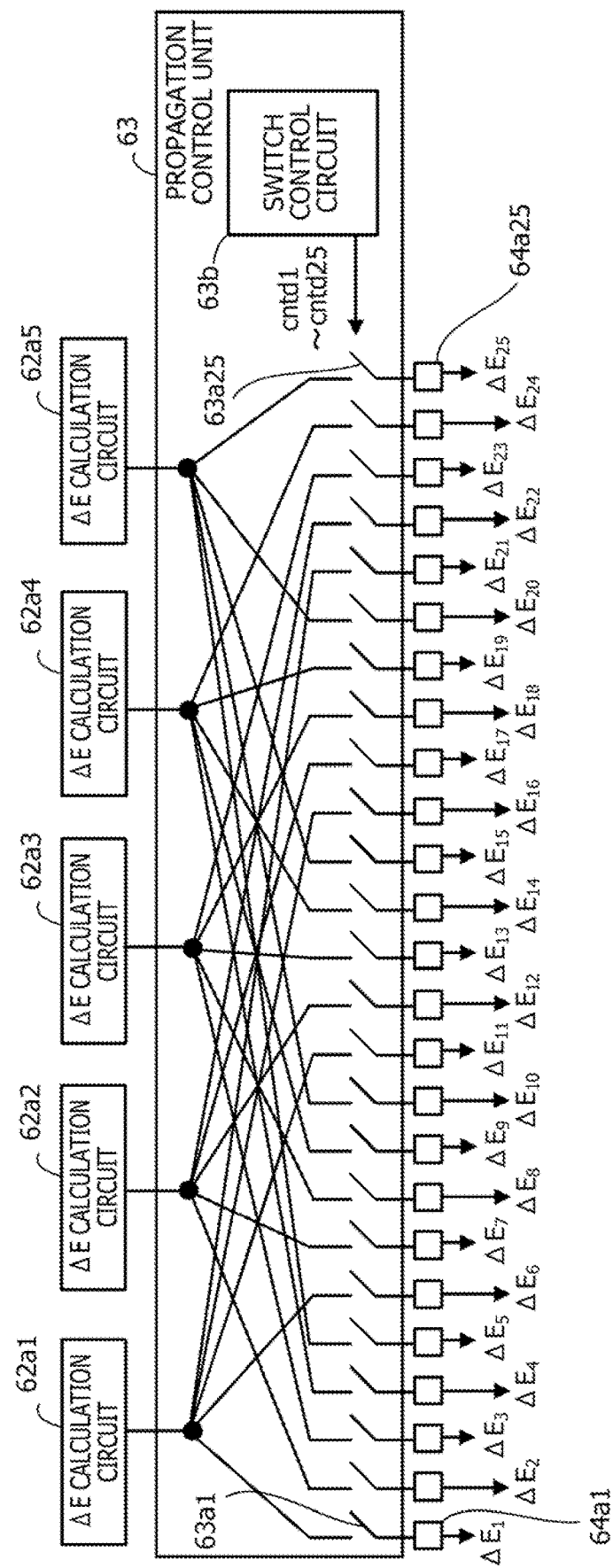
FIG. 25 is a diagram illustrating an example of the propagation control unit that propagates an energy change.

FIG. 25 is a diagram illustrating an example of the propagation control unit that propagates an energy change.

The propagation control unit 63 propagates the energy changes calculated by the five ΔE calculation circuits 62a1 to 62a5 to any five of the twenty-five ΔE holding units 64a1 to 64a25. The propagation control unit 63 includes twenty-five switches 63a1 to 63a25 and a switch control circuit 63b. Note that the five black circles in FIG. 25 function as demultiplexers.

The switch control circuit 63b turns on any five of the switches 63a1 to 63a25 and turns off the other switches to propagate the energy changes calculated by the ΔE calculation circuits 62a1 to 62a5 to any five of the ΔE holding units 64a1 to 64a25.

For example, as illustrated in FIG. 20, in a case where $\Delta E_1$ to $\Delta E_{25}$ are calculated in twenty cycles, in cycle 4 where the calculation of $\Delta E_1$ to $\Delta E_5$ is completed, the five switches connected to the ΔE holding units that hold $\Delta E_1$ to $\Delta E_5$, out of the switches 63a1 to 63a25, are turned on. In cycle 8 where the calculation of $\Delta E_6$ to $\Delta E_{10}$ is completed, the five switches connected to the ΔE holding units that hold $\Delta E_6$ to $\Delta E_{10}$, out of the switches 63a1 to 63a25, are turned on. In cycle 12 where the calculation of $\Delta E_{11}$ to $\Delta E_{15}$ is completed, the five switches connected to the ΔE holding units that hold $\Delta E_{11}$ to $\Delta E_{15}$, out of the switches 63a1 to 63a25, are turned on. In cycle 16 where the calculation of $\Delta E_{16}$ to $\Delta E_{20}$ is completed, the five switches connected to the ΔE holding units that hold $\Delta E_{16}$ to $\Delta E_{20}$, out of the switches 63a1 to 63a25, are turned on. In cycle 20 where the calculation of $\Delta E_{21}$ to $\Delta E_{25}$ is completed, the five switches connected to the ΔE holding units that hold $\Delta E_{21}$ to $\Delta E_{25}$, out of the switches 63a1 to 63a25, are turned on.

As a result, n=25 energy changes input to the transition selection unit 25 as illustrated in FIG. 2 can be obtained. Other than that, a similar operation to that of the optimization device 20 of the second embodiment is performed. Note that, in a case where the transition selection unit 25 inputs $N^2$ energy changes by N energy changes at a time, and selects one energy change from the N energy changes, the propagation control unit 63 and ΔE holding units 64a1 to 64an illustrated in FIG. 18 may not be needed.

As described above, even if the number of ΔE calculation circuits 62a1 to 62aN is smaller than $N^2$, a similar effect to the effect of the optimization device 20 of the second embodiment can be obtained by the propagation unit 61 propagating the local fields and weighting coefficients to be used for calculation.

Modification

By the way, the state variables included in the evaluation function may include state variables that are not subject to 2-Way 1-hot constraints in addition to the $N^2$ state variables that are subject to 2-Way 1-hot constraints.

In that case, the ΔE calculation circuit may be configured as follows.

Figure 26:
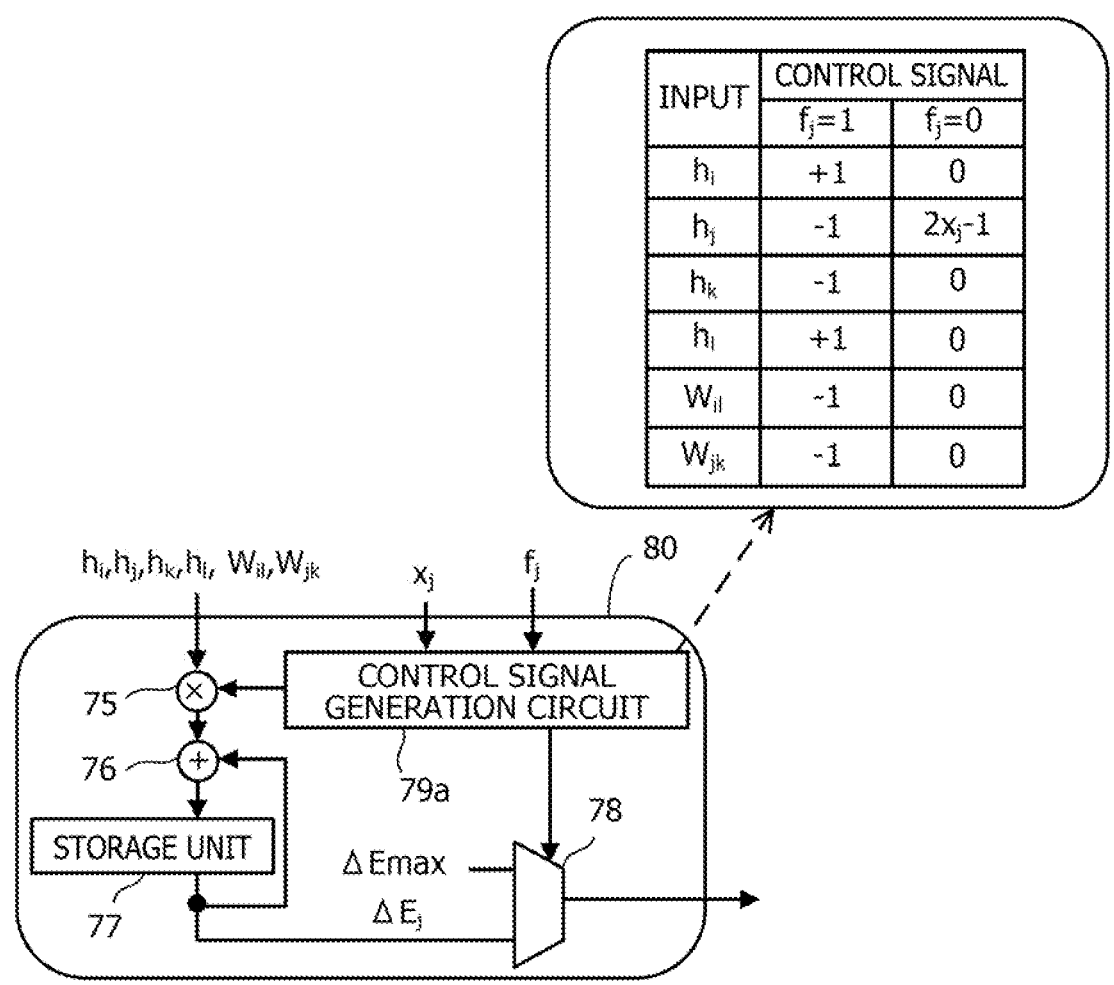
FIG. 26 is a diagram illustrating a modification of the ΔE calculation circuit.

FIG. 26 is a diagram illustrating a modification of the ΔE calculation circuit. In FIG. 26, elements similar to the ΔE calculation circuit 62a1 illustrated in FIG. 19 are denoted by the same reference numerals.

A ΔE calculation circuit 80 in the modification is different from the control signal generation circuit 79 in FIG. 19 in a control signal generation circuit 79a. Furthermore, it is assumed that each state variable and a flag value indicating whether or not the state variable is subject to 2-Way 1-hot constraints are stored in a storage unit (not illustrated).

For example, in a case where $x_j$ is a state variable subject to 2-Way 1-hot constraints, a flag value ($f_j$) is 1. In contrast, in a case where $x_j$ is a state variable that is not subject to 2-Way 1-hot constraints, the flag value ($f_j$) is 0.

The control signal generation circuit 79a reads $f_j$ together with $x_j$, and outputs +1 or −1 as a control signal to $h_j$, $h_j$, $h_k$, $h_l$, $W_{il}$, and $W_{jk}$ as described above in the case of $f_j=1$. The control signal generation circuit 79a outputs 0 as the control signal to $h_j$, $h_k$, $h_k$, $h_l$, $W_{il}$, and $W_{jk}$, and outputs $2x_j−1$ to $h_j$ in the case of $f_j=0$. As a result, $\Delta E_j=(2x_j−1)h_j$. $2x_j−1$ is a change amount in $x_j$, and $(2x_j−1)h_j$ represents the energy change in a case where only $x_j$ changes among all the state variables. Note that, in the case of $f_j=0$, the control signal generation circuit 79a causes the selector 78 to select $\Delta E_j$.

Note that, in a case where $\Delta E_j$ is selected in the case where $x_j$ of $f_j=0$ changes in the transition selection unit 25, only one bit of $x_j$ is updated. Then, the local field is also updated according to the update.

For example, with such a configuration, the processing becomes possible even if the state variables included in the evaluation function include state variables that are not subject to 2-Way 1-hot constraints in addition to the $N^2$ state variables that are subject to 2-Way 1-hot constraints.

In the above, one aspect of the optimization device and the optimization method of the present embodiment has been described on the basis of the embodiments; however, these are only examples and are not limited to the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization device of searching for an optimal solution of an optimization problem having a 2-Way 1-hot constraint the optimization device comprising:
    a calculation circuit configured to calculate, for each of a plurality of first state variables, a first change amount of energy of an Ising model representing the optimization problem, the first change amount being a change amount caused by changing values of four state variables being selected based on the 2-Way 1-hot constraint from among a plurality of state variables in the Ising model, each of a plurality of first state variables being a state variable having a value of 0 among the plurality of state variables in the Ising mode before the changing, the calculation circuit being configured to perform the calculating of the first change amount so as to satisfy the 2-Way 1-hot constraint that a sum of values of state variables included in each row is 1, and a sum of values of state variables included in each column is 1, when N (N is an integer of 2 or larger) squared state variables included in an evaluation function representing the energy of the Ising model are arrayed in N rows and N columns;
    a transition selection circuit configured to
        select the four state variables allowed to change based on the first change amount calculated for each of the plurality of first state variables, and
        output identification information for identifying the selected four state variables; and
    an update circuit configured to update values of the four state variables allowed to change based on the identification information.

2. The optimization device according to claim 1, wherein the calculation circuit includes a plurality of energy change calculation circuits each configured to calculate any of the first change amounts for the plurality of respective first state variables,
the optimization device further comprising:
    a propagation circuit configured to propagate, to each of the plurality of energy change calculation circuits, any of N squared local fields each representing a magnitude of a second change amount of the energy of the Ising model due to a change in one of the N squared state variables, the local field being to be used for calculating the first change amount, based on the identification information.

3. The optimization device according to claim 2, wherein the propagation circuit is configured to supply, to each of the plurality of energy change calculation circuits, a first local field for any one of the plurality of first state variables, a second local field for a second state variable included in a same row as the first state variable and having a value of 1, a third local field for a third state variable included in a same column as the first state variable and having a value of 1, and a fourth local field for a fourth state variable included in a same column as the second state variable and in a same row as the third state variable, and having a value of 0, on based on the identification information.

4. The optimization device according to claim 2, wherein the propagation circuit is configured to supply each of the N squared local fields to any of the plurality of energy change calculation circuits in a time division manner or in parallel using a plurality of buses.

5. The optimization device according to claim 1, further comprising:
    a storage circuit configured to store a plurality of weighting coefficients each indicating a magnitude of interaction between each two of the N squared state variables; and
    an address decoder configured to specify an address of the storage circuit that stores a weighting coefficient group to be used for calculating the first change amount, of the plurality of weighting coefficients, based on the identification information, wherein
    the storage circuit reads the weighting coefficient group at once based on the address.

6. An optimization method implemented by an optimization device of searching for an optimal solution of an optimization problem having a 2-Way 1-hot constraint, the method comprising:
    calculating, at a calculation circuit of the optimization device, for each of a plurality of first state variables, a first change amount of energy of an Ising model representing the optimization problem, the change amount being a change amount caused by changing values of four state variables being selected based on the 2-Way 1-hot constraint from among a plurality of state variables in the Ising model, each of a plurality of first state variables being a state variable having a value of 0 among the plurality of state variables in the Ising mode before the changing, the calculation circuit being configured to perform the calculating of the first change amount so as to satisfy the 2-Way 1-constraint that a sum of values of state variables included in each row is 1, and a sum of values of state variables included in each column is 1, when N (N is an integer of 2 or larger)

squared state variables included in an evaluation function representing the energy of the Ising model are arrayed in N rows and N columns;

selecting, at a transition selection circuit of the optimization device, the four state variables allowed to change based on the change amount calculated for each of the plurality of first state variables, and outputting identification information for identifying the selected four state variables; and updating, at an update circuit of the optimization device, values of the four state variables allowed to change based on the identification information.

\* \* \* \* \*